(12) United States Patent
Fanfani et al.

(10) Patent No.: US 10,639,866 B2
(45) Date of Patent: May 5, 2020

(54) MULTILAYER FILM FOR VACUUM SKIN PACKAGING, METHOD OF PACKAGING AND PACKAGES OBTAINED THEREWITH

(71) Applicants: Andrea Fanfani, Milan (IT); Robert Babrowicz, Spartanburg, SC (US); Alessandra Ghirardi, Milan (IT)

(72) Inventors: Andrea Fanfani, Milan (IT); Robert Babrowicz, Spartanburg, SC (US); Alessandra Ghirardi, Milan (IT)

(73) Assignee: Cryovac, LLC, Charlotte, NC (US)

( * ) Notice: Subject to any disclaimer, the term of this patent is extended or adjusted under 35 U.S.C. 154(b) by 133 days.

(21) Appl. No.: 16/069,920

(22) PCT Filed: Mar. 7, 2017

(86) PCT No.: PCT/EP2017/055374
§ 371 (c)(1),
(2) Date: Jul. 13, 2018

(87) PCT Pub. No.: WO2017/153439
PCT Pub. Date: Sep. 14, 2017

(65) Prior Publication Data
US 2019/0030857 A1    Jan. 31, 2019

(30) Foreign Application Priority Data
Mar. 7, 2016  (EP) .................................... 16159037

(51) Int. Cl.
*B32B 27/36*  (2006.01)
*B32B 7/06*  (2019.01)
*B32B 27/10*  (2006.01)
*B32B 27/30*  (2006.01)
(Continued)

(52) U.S. Cl.
CPC ................. *B32B 7/06* (2013.01); *B32B 5/18* (2013.01); *B32B 7/12* (2013.01); *B32B 15/046* (2013.01); *B32B 15/09* (2013.01); *B32B 15/20* (2013.01); *B32B 25/08* (2013.01); *B32B 25/14* (2013.01); *B32B 25/18* (2013.01); *B32B 27/065* (2013.01); *B32B 27/08* (2013.01); *B32B 27/10* (2013.01); *B32B 27/302* (2013.01);
(Continued)

(58) Field of Classification Search
CPC .............................. B32B 27/36; B65D 81/34
USPC ............................................. 428/34.1, 35.7
See application file for complete search history.

(56) References Cited

FOREIGN PATENT DOCUMENTS

| EP | 1728731 | 12/2006 |
|---|---|---|
| WO | 2009032627 | 3/2009 |
| WO | 2015107127 | 7/2015 |

OTHER PUBLICATIONS

"ASTM D3418-08 Standard Test Method for Transition Temperatures and Enthalpies of Fusion and Crystallization of Polymers by Differential Scanning Calorimetry" In: ASTM D3418-08 Standard Test Method for Transition Temperatures and Enthalpies of Fusion and Crystallization of Polymers by Differential Scanning Calorimetry, Jan. 1, 2008 (Jan. 1, 2008), ASTM International, XP055070965, p. 3, paragraph 10.2.

Primary Examiner — Ellen S Hock
(74) Attorney, Agent, or Firm — Jason R. Womer

(57) ABSTRACT

The present invention relates to packaging films, more specifically to cross-linked packaging films useful in vacuum skin packaging applications characterized by versatile sealing properties, especially by unexpected versatile sealability on polyester and on different substrates, to a method of packaging by using said films and to packages obtained therewith. Said packages show high drip retention, easy openability and good performance in microwave applications.

21 Claims, 2 Drawing Sheets

(51) Int. Cl.
| | |
|---|---|
| *B32B 15/04* | (2006.01) |
| *B32B 25/14* | (2006.01) |
| *B32B 29/00* | (2006.01) |
| *B32B 25/18* | (2006.01) |
| *B32B 15/09* | (2006.01) |
| *B32B 27/06* | (2006.01) |
| *B32B 5/18* | (2006.01) |
| *B32B 15/20* | (2006.01) |
| *B32B 25/08* | (2006.01) |
| *B32B 7/12* | (2006.01) |
| *B32B 27/08* | (2006.01) |
| *B32B 27/32* | (2006.01) |
| *B32B 27/34* | (2006.01) |
| *B65B 11/52* | (2006.01) |

(52) U.S. Cl.
CPC .......... *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 29/007* (2013.01); *B32B 2250/02* (2013.01); *B32B 2250/03* (2013.01); *B32B 2250/05* (2013.01); *B32B 2250/24* (2013.01); *B32B 2250/244* (2013.01); *B32B 2255/12* (2013.01); *B32B 2255/26* (2013.01); *B32B 2266/0264* (2013.01); *B32B 2270/00* (2013.01); *B32B 2307/31* (2013.01); *B32B 2307/40* (2013.01); *B32B 2307/406* (2013.01); *B32B 2307/412* (2013.01); *B32B 2307/51* (2013.01); *B32B 2307/54* (2013.01); *B32B 2307/546* (2013.01); *B32B 2307/7163* (2013.01); *B32B 2307/7244* (2013.01); *B32B 2307/732* (2013.01); *B32B 2307/738* (2013.01); *B32B 2307/748* (2013.01); *B32B 2307/75* (2013.01); *B32B 2439/40* (2013.01); *B32B 2439/70* (2013.01); *B65B 11/52* (2013.01); *Y02W 90/12* (2015.05); *Y02W 90/14* (2015.05)

MULTILAYER FILM FOR VACUUM SKIN PACKAGING, METHOD OF PACKAGING AND PACKAGES OBTAINED THEREWITH

TECHNICAL FIELD

The present invention relates to packaging films useful in vacuum skin packaging applications endowed with very high formability, implosion resistance, machinability and abuse resistance and characterized by excellent drip retention properties and easy opening particularly when sealed onto polyester-based supports, to their method of manufacturing, to a method of packaging by using said films and to packages obtained therewith.

BACKGROUND ART

Vacuum skin packaging (VSP) is a process well known in the art using a thermoplastic packaging material to enclose a food product. The terms "vacuum skin packaging" or "VSP" as used herein indicate that the product is packaged under vacuum and the space containing the product is evacuated from gases at the moment of packaging. The top flexible film is also referred to as "skin-forming", "skin" or "upper" film.

In the vacuum skin packaging process, an article may be placed on a rigid, semi-rigid or flexible support member, that can be flat or shaped, e.g., tray-shaped, bowl-shaped or cup-shaped (called "bottom" web), and the supported article is then passed to a chamber where a "top" web is first drawn upward against a heated dome and then draped down over the article. The movement of the top web is controlled by vacuum and/or air pressure, and in a vacuum skin packaging arrangement, the interior of the container is vacuumed before final welding of the top web to the bottom web. In the VSP process, the upper heated film forms a tight skin around the product and is tightly adhered to the part of the support not covered by the product. Vacuum skin packaging is described in many references, including FR1258357, FR1286018, AU3491504, U.S. Re 30009, U.S. Pat. Nos. 3,574,642, 3,681,092, 3,713,849, 4,055,672, 5,346,735, WO2009141214, EP2722279, EP2459448.

Vacuum skin packaging is commonly employed for packaging food products such as fresh and frozen meat and fish, cheese, processed meat, ready meals and the like. The final package presents a tight fitting, clear package which protects the food article from the external environment.

The demands imposed nowadays on the packaging films used in such vacuum skin packaging applications are particularly high: the films have to stand the heating and stretching conditions within the vacuum chamber of the packaging machine without undergoing excessive softening and perforations, they must be highly formable and have an excellent implosion resistance (as hereinafter defined) in addition of being ovenable, in case of ready-meals packaging.

Good formability is highly desirable in VSP applications to ensure that the heated film adequately conforms to the shape of the packaged product, without leaving pleats on the package surfaces or without forming protruding areas of self-adhesion of the film, at the package corners or sides. This unwanted phenomenon, known as bridging or webbing, can be so marked to extend to separate forming units in the same packaging operation. Obviously, packages showing these defects in the top skin draping are not acceptable for the consumer and therefore they have to be rejected. Other important features of VSP films include optical properties, such as glossiness and haze, which contribute to an attractive package appearance.

Moreover, VSP films must guarantee, in combination with supports of various shape and composition, an appropriate opening force in order to allow the consumer easily opening the package and taking out the packaged product. During storage, in addition to easy openability, seal and package integrity must be kept, in order to effectively preserve the product.

As well known in the art, such performance in terms of easy opening and integrity is particularly difficult to be achieved in a vacuum skin package. In fact, vacuum skin packaging processes do not apply a standard sealing step through a heated sealing bar, as for example in tray lidding packaging processes, but the adhesion of the top to the bottom is achieved through the draping of the heated top onto the entire surface of the bottom not covered by the product after removal of the vacuum from the dome. The final quality and strength of the adhesion are mainly dependent on the temperature achieved by the top, on the sealing properties of the outer surfaces and on the chemical compatibility between the sealant layers of the top and the bottom.

In case of films for vacuum skin ready meals packages, the above requirements of easy openability and hermeticity are even more difficult to be achieved. The seal strength must be adequate to keep the packs hermetic before the heat/microwave treatment step and to allow easy opening by the consumer after that treatment.

For ready meals applications, which necessitate heating or cooking of the food product in conventional or microwave ovens, supports currently used are polyester-based, (e.g. APET, CPET trays), as polyesters are endowed with the required thermal properties.

However, directly sealing conventional VSP top films to polyester based supports has always been difficult due to the scarce sealing characteristics of polyesters.

For this reason, polyester supports have generally been coated with sealants or sealable layer in order to be properly sealed to a top film.

In the alternative, top films have been subjected to superficial treatments (e.g. corona treatments) in order to improve sealability as described for instance in EP1728731, commented below.

It would be desirable to make available to the market VSP top films having very good sealability on polyester supports, but not only, and possibly being ovenable, particularly microwaveable.

Another important feature of VSP packages, particularly for fresh meat (including poultry) or fish, is the capacity of controlling the drip loss, i.e. the liquid purge or juices, which exude from the packaged food over time. Such purge not only make the package quite unpleasant at first sight for the final consumer, but also represents a net weight loss of the product to be consumed.

EP1728731, in the name of Curwood, relates to vacuum skin packages formed from a thermoplastic film and a polyester substrate. In order to get a peelable seal between the film and the substrate in a vacuum skin package, EP '731 suggests to perform a surface-treatment to the exterior surface of the film structure thus reaching a surface tension of between 36-60 dynes/cm in order to obtain seal force values in the seal between the top film and the substrate from 0.5 to 6 lb./in. (0.09-1.08 kg/cm).

The top web layers construction exemplified in EP '731 is ethylene vinyl acetate/ionomer/modified polyethylene/ethylene vinyl alcohol/modified polyethylene/ionomer/low density polyethylene. This document is not concerned with the problem of product drip loss in the final package.

A top web having this composition is available on the market and has been tested by the Applicant as hereinafter described (see example C8 comparative film in the experimental part).

The document WO2009032627 in the name of DuPont describes packaging films comprising a polyester substrate and a (co)polyester based sealant layer. These films are not cross-linked. This document is not concerned with the problem of drip loss in VSP packages.

The document WO2015107127A1 in the name of Cryovac, relates to heat-shrinkable films for manufacturing flexible containers (bags) and not to thermoformable films suitable for VSP applications. Accordingly, this document does not provide any teaching relating to drip retention capacity or seal-peel performance in VSP packages. The VSP films presently on the market, such as those described in EP1728731, still need to be improved in term of drip loss retention.

In conclusion, there is still the need to provide VSP films showing an optimized balance of properties, especially the best mix of mechanics, optics and formability, being sealable on supports of various chemical nature, especially on polyesters, and possibly being ovenable, particularly microwaveable. It is desirable that these films can provide VSP packages which are self-venting, easy openable even after heat treatments, and, especially, endowed with an improved drip retention capacity.

SUMMARY OF THE INVENTION

It has now been found that by cross-linking a top film with a sealant layer comprising one or more (co)polyester, characterized by peculiar glass transition and melting point temperatures, an unexpectedly highly formable film—which is nevertheless resistant to implosions and which does not break during the vacuum skin packaging process, and which is advantageously sealable onto different materials—resulted. The vacuum skin packages obtained from this top film, in addition to being microwavable and, during heating, self-venting show easy openability and an excellent drip retention capacity.

Unexpectedly, cross-linking does not impair the seal performance of the film but, on the contrary, provides for a very versatile sealant, which is able to effectively seal onto a variety of materials such as EVA, polyesters or even aluminium and steel, showing at the same time an optimal peelability.

Furthermore, the combination of the specific polyester sealant composition with cross-linking imparts to the present films a surprising capability of preventing drip loss from products when used as top webs in VSP packages.

Accordingly, it is a first object of the present invention a cross-linked film suitable for use as top web in vacuum skin packaging comprising at least:
- an outer sealing layer a) comprising one or more (co)polyesters having a glass transition temperature (Tg) not higher than 50° C., preferably than 35° C., more preferably than 20° C. and/or a melting point temperature (Tm) not higher than 170° C., preferably than 160° C., more preferably than 150° C.,
- an outer abuse layer c) comprising one or more polymer(s) selected from the group consisting of polyolefins and their copolymers, polyamides, polyesters, styrene-based polymers and optionally a tie layer b) interposed between layer a) and c).

A second object of the present invention is a vacuum skin package comprising a support, a product loaded onto said support and a top film according to the first object of the present invention, said film being draped over the product and sealed over the entire surface of the support not covered by the product.

A third object of the present invention is a vacuum skin packaging process, in which the top skin film is the film according to the first object of the present invention.

In particular, an object of the present invention is a vacuum skin packaging process, which comprises
- providing a cross-linked top film, according to the first object of the present invention, comprising an outer sealing layer a)
- providing a support,
- disposing the film over the support, with the outer sealing layer a) of the top film facing the support,
- disposing a product between the top film and the support,
- heating the top film and moulding it down upon and around the product and against the support, the space between the heated top film and the support having been evacuated to form a tight skin around the product, and
- tight sealing said top film over the entire surface of the support not covered by the product by differential air pressure.

A fourth object of the present invention is the use of a film according to the first object of the present invention as a top web for vacuum skin packaging applications.

Definitions

As used herein the term "tie layer" refers to any internal layer having the primary purpose of adhering two layers to one another.

As used herein, the phrase "outer layer" in connection with the multi-layer film refers to a layer having only one of its principal surfaces directly adhered to another layer of the film.

As used herein "sealing layer" or "sealant layer" or "heat sealable layer" is the outer layer of the multi-layer film that in the VSP packaging process will be in contact with the food product and will seal to the support, while "abuse layer" will be the outer layer that in the VSP packaging process will be in contact with the heated dome.

As used herein, the phrase "inner layer" in connection with the multi-layer film refers to a layer having both its surfaces adhered to other layers of the film As used herein the term "directly adhered" as applied to the layers of a multi-layer film, refers to the adhesion of a first element to a second element, without an adhesive, a tie layer or any other layer therebetween. In contrast, as used herein, the word "adhered" when used without the adverb "directly" broadly refers to the adhesion of a first element to a second element either with or without an adhesive, a tie layer or any other layer therebetween.

As used herein, the term "bulk layer" or "structural" layer refers to a layer generally used to improve the abuse or puncture resistance of the film or just to provide the desired thickness.

As used herein, the term "copolymer" refers to a polymer derived from two or more types of monomers, and includes terpolymers.

As used herein the term "polyolefin" refers to any polymerized or co-polymerized olefin that can be linear, branched, or cyclic, substituted or unsubstituted, and possibly modified. Resins such as polyethylene, ethylene-alpha-(C4-C8) olefin copolymers, ethylene-propylene copolymers, ethylene-propylene-alpha-(C4-C8)olefin ter-polymers, propylene-butene copolymer, polybutene, poly(4-methylpentene-1), ethylene-propylene rubber, butyl rubber, as well as copolymers of ethylene (or a higher olefin) with a comonomer which is not an olefin and in which the ethylene (or higher olefin) monomer predominates such as ethylene-vinyl acetate copolymers, ethylene-acrylic acid copolymers, ethylene-alkyl acrylate copolymers, ethylene-methacrylic acid copolymers, ethylene-alkyl methacrylate copolymers, ethylene-alkyl acrylate-maleic anhydride copolymers, ionomers, as well the blends thereof in any proportions are all included. Also included are the modified polyolefins, where the term "modified" is intended to refer to the presence of polar groups in the polymer backbone. The above polyolefin resins can be "heterogeneous" or "homogeneous", wherein these terms refer to the catalysis conditions employed and as a consequence thereof to the particular distribution of the molecular weight, branched chains size and distribution along the polymer backbone, as known in the art.

As used herein, the phrase "ethylen-alpha-olefin copolymer" refers to heterogeneous and to homogeneous polymers such as linear low density polyethylene (LLDPE) with a density usually in the range of from about 0.900 g/cm3 to about 0.930 g/cm3, linear medium density polyethylene (LMDPE) with a density usually in the range of from about 0.930 g/cm3 to about 0.945 g/cm3, and very low and ultra low density polyethylene (VLDPE and ULDPE) with a density lower than about 0.915 g/cm3, typically in the range 0.868 to 0.915 g/cm3, and such as metallocene-catalyzed EXACT™ and EXCEED™ homogeneous resins obtainable from Exxon, single-site AFFINITY™ resins obtainable from Dow, and TAFMER™ homogeneous ethylene-alpha-olefin copolymer resins obtainable from Mitsui. All these materials generally include co-polymers of ethylene with one or more co-monomers selected from (C4-C10)-alpha-olefin such as butene-1, hexene-1, octene-1, etc., in which the molecules of the copolymers comprise long chains with relatively few side chain branches or cross-linked structures.

As used herein the term "ethylene-alpha-(C4-C8)olefin copolymers" is intended to refer to both heterogeneous and homogeneous (e.g., "single site", or "metallocene") materials with densities of from about 0.87 to about 0.95 g/cm3.

As used herein, the phrase "heterogeneous polymer" or "polymer obtained by heterogeneous catalysis" refers to polymerization reaction products of relatively wide variation in molecular weight and relatively wide variation in composition distribution, i.e., typical polymers prepared, for example, using conventional Ziegler-Natta catalysts, for example, metal halides activated by an organometallic catalyst, i. e., titanium chloride, optionally containing magnesium chloride, complexed to trialkyl aluminum and may be found in patents such as U.S. Pat. No. 4,302,565 to Goeke et al. and U.S. Pat. No. 4,302,566 to Karol, et al. Heterogeneous catalyzed copolymers of ethylene and an -olefin may include linear low-density polyethylene, very low-density polyethylene and ultra low-density polyethylene. Some copolymers of this type are available from, for example, The Dow Chemical Company, of Midland, Mich., U.S.A. and sold under the trademark DOWLEX resins.

As used herein, the phrase "homogeneous polymer" or "polymer obtained by homogeneous catalysis" refers to polymerization reaction products of relatively narrow molecular weight distribution and relatively narrow composition distribution. Homogeneous polymers are structurally different from heterogeneous polymers, in that homogeneous polymers exhibit a relatively even sequencing of co-monomers within a chain, a mirroring of sequence distribution in all chains, and a similarity of length of all chains, i.e., a narrower molecular weight distribution. This term includes those homogeneous polymers prepared using metallocenes, or other single-site type catalysts, as well as those homogenous polymers that are obtained using Ziegler Natta catalysts in homogenous catalysis conditions.

The co-polymerization of ethylene and alpha-olefins under homogeneous catalysis, for example, co-polymerization with metallocene catalysis systems which include constrained geometry catalysts, i.e., monocyclopentadienyl transition-metal complexes is described in U.S. Pat. No. 5,026,798 to Canich. Homogeneous ethylene/alpha-olefin copolymers (E/AO) may include modified or unmodified ethylene/alpha-olefin copolymers having a long-chain branched (8-20 pendant carbons atoms) alpha-olefin comonomer available from The Dow Chemical Company, known as AFFINITY and ATTANE resins, TAFMER linear copolymers obtainable from the Mitsui Petrochemical Corporation of Tokyo, Japan, and modified or unmodified ethylene/-olefin copolymers having a short-chain branched (3-6 pendant carbons atoms)-olefin comonomer known as EXACT resins obtainable from ExxonMobil Chemical Company of Houston, Tex., U.S.A.

As used herein the term "ionomer" designates metal salts of acidic copolymers, such as metal salts of ethylene/acrylic acid copolymers or metal salts of ethylene/methacrylic acid copolymers, wherein the metal cation can be an alkali metal ion, a zinc ion or other multivalent metal ions. These resins are available, for instance, from DuPont under the trade name Surlyn™.

As used herein, the term "polyester" refers in general to homopolymers or copolymers having an ester linkage between monomer units which may be formed, for example, by condensation polymerization reactions between a dicarboxylic acid and glycol. The ester monomer unit may be represented by the general chemical formula: R—C(O)O—R' where R and R'=an alkyl group and may be generally formed from the polymerization of dicarboxylic acid and diol monomers or monomers containing both carboxylic acid and hydroxy moieties. The dicarboxylic acid may be linear or aliphatic, i.e., oxalic acid, malonic acid, succinic acid, glutaric acid, adipic acid, pimelic acid, suberic acid, azelaic acid, sebacic acid, and the like; or may be aromatic or alkyl-substituted aromatic acids, i.e., various isomers of phthalic acid, such as paraphthalic acid (or terephthalic acid), isophthalic acid and naphthalic acid. Specific examples of alkyl-substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The glycols may be straight-chained or branched. Specific examples include ethylene glycol, propylene glycol, trimethylene glycol, 1,4-butane diol, neopentyl glycol and the like. The polyalkyl terephthalates are aromatic esters having a benzene ring with ester linkages at the 1,4-carbons of the benzene ring as compared to polyalkyl isophthalates, where two ester linkages are present at the 1,3-carbons of the benzene ring. In contrast, polyalkyl naphthalates are aromatic esters having two fused benzene rings where the two ester linkages may be present at the 2,3-carbons or the 1,6-carbons.

As used herein, the phrase "modified polymer", as well as more specific phrases such as "modified ethylene/vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith. As used herein, the term "modified" refers to a chemical derivative, e.g. one having any form of anhydride functionality, such as anhydride of maleic acid, crotonic acid, citraconic acid, itaconic acid, fumaric acid, etc., whether grafted onto a polymer, copolymerized with a polymer, or blended with one or more polymers, and is also inclusive of derivatives of such functionalities, such as acids, esters, and metal salts derived therefrom. As used herein, the phrase "anhydride-containing polymer" and "anhydride-modified polymer", refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, terms identifying polymers, such as "polyamide", "polyester", etc. are in general inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein the term "polyamide" refers to high molecular weight polymers having amide linkages along the molecular chain, and refers more specifically to synthetic polyamides such as nylons. Such term encompasses both homo-polyamides and co-(or ter-)polyamides. It also specifically includes aliphatic polyamides or co-polyamides, aromatic polyamides or co-polyamides, and partially aromatic polyamides or co-polyamides, modifications thereof and blends thereof. The homo-polyamides are derived from the polymerization of a single type of monomer comprising both the chemical functions which are typical of polyamides, i.e. amino and acid groups, such monomers being typically lactams or aminoacids, or from the polycondensation of two types of polyfunctional monomers, i.e. polyamines with polybasic acids. The co-, ter-, and multi-polyamides are derived from the copolymerization of precursor monomers of at least two (three or more) different polyamides. As an example in the preparation of the co-polyamides, two different lactams may be employed, or two types of polyamines and polyacids, or a lactam on one side and a polyamine and a polyacid on the other side. Exemplary polymers are polyamide 6, polyamide 6/9, polyamide 6/10, polyamide 6/12, polyamide 11, polyamide 12, polyamide 6/12, polyamide 6/66, polyamide 66/6/10, modifications thereof and blends thereof. Said term also includes crystalline or partially crystalline, aromatic or partially aromatic polyamides.

As used herein, the phrase "amorphous polyamide" refers to polyamides or nylons with an absence of a regular three-dimensional arrangement of molecules or subunits of molecules extending over distances, which are large relative to atomic dimensions. However, regularity of structure exists on a local scale. See, "Amorphous Polymers," in Encyclopedia of Polymer Science and Engineering, 2nd Ed., pp. 789-842 (J. Wiley & Sons, Inc. 1985). This document has a Library of Congress Catalogue Card Number of 84-19713. In particular, the term "amorphous polyamide" refers to a material recognized by one skilled in the art of differential scanning calorimetry (DSC) as having no measurable melting point (less than 0.5 cal/g) or no heat of fusion as measured by DSC using ASTM D 3418. Such nylons include those amorphous nylons prepared from condensation polymerization reactions of diamines with dicarboxylic acids. For example, an aliphatic diamine is combined with an aromatic dicarboxylic acid, or an aromatic diamine is combined with an aliphatic dicarboxylic acid to give suitable amorphous nylons.

As used herein, the term "EVOH" includes saponified or hydrolyzed ethylene-vinyl acetate copolymers, and refers to vinyl alcohol copolymers having an ethylene comonomer content preferably comprised from about 25 to about 48 mole %, more preferably, from about 32 to about 44 mole % ethylene, and even more preferably, from about 38 to about 44 mole % ethylene, and a saponification degree of at least 85%, preferably at least 90%.

As used herein the term "barrier layer" refers to a gas barrier layer or, preferably, to an oxygen-barrier layer and it is used to identify layers or structures characterized by an Oxygen Transmission Rate (evaluated at 23° C. and 0% R.H. according to ASTM D-3985) of less than 500 $cm^3 m^2 \cdot day \cdot atm$. Suitable thermoplastic materials that would provide such gas-barrier properties are PVDC, polyamides, EVOH, polyesters, and blends thereof, preferably EVOH.

As used herein, the phrases "longitudinal direction" and "machine direction", herein abbreviated "LD" or "MD", refer to a direction "along the length" of the film, i.e., in the direction of the film as the film is formed during coextrusion. When referred to packages, they relate to their motion direction in the packaging equipment.

As used herein, the phrase "transverse direction" or "crosswise direction", herein abbreviated "TD", refers to a direction across the film, perpendicular to the machine or longitudinal direction. When referred to packages, they relate to their motion direction in the packaging equipment.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching.

As used herein, the term "not heat-shrinkable" refers to a film characterized by a total free shrink percentage (i.e. the sum of free shrink percentage in LD and TD directions) measured in oil at 160° C. according to D2732 test method lower than 20% or 15%, preferably lower than 10%. As used herein, the term "Easy opening VSP package" means a VSP package showing an opening force, measured by using the method described herein (Experimental Part) of from 120 to 900 g/2.54 cm, 150 to 900 g/2.54 cm, preferably 150 to 800 g/2.54 cm or 200 to 800 g/2.54 cm or from 150 to 600 g/2.54 cm more preferably 150 to 400 g/2.54 cm or 250 to 600 g/2.54 cm.

As used herein, the phrase "film suitable for use as top web in vacuum skin packaging" refers to a thermoplastic film which is suitable for use in a VSP process, namely a film able to stand heating and stretching conditions within the vacuum chamber of the packaging machine without undergoing perforations and excessive softening and, afterwards, able to tight adhering to the surface of the support. Preferably, a film for use as a top web in VSP applications is characterized by high implosion resistance, formability and sealability as defined and evaluated according to the present description.

As used herein the term "support" means the bottom part of the VSP package into which the product is accommodated and onto which the top skin film is sealed for the part that is not covered by the product. The support can be flat or shaped, i.e. tray-shaped, rigid, semi-rigid or flexible. The support may be an, optionally perforated, in-line thermoformed bottom or an off-line pre-made tray.

As used herein, the term "sealing temperature" refers to the temperature of the dome of the VSP equipment, onto which the top web is applied by suction and by which is heated during the VSP cycle.

As used herein the term "microwavable" when used in connection with the films or the VSP packages of the present invention, refers to those structures that are "substantially microwave transparent" as well as those that are "microwave active".

While substantially microwave-transparent are those capable of being crossed by at least 80%, preferably at least 90% of the microwaves generated by a microwave oven without any sort of interference therewith, the microwave-active are those that incorporate microwave reflective components intended to modify the energy deposition within the adjacent foodstuff. To be "microwaveable" in both cases, under the conditions of use, the packaging material should not be degraded or deformed and it should not release more than 60 ppm of global contaminants to the packaged food in contact therewith. In practice, packaging materials that withstand a heat treatment at 121° C. for 30 min (conditions that are drastic enough not to be reached normally in microwave cooking) without deforming and releasing less than 60 ppm of contaminants, are considered to be "microwaveable" according to most of the food laws.

As used herein, the term "gel content" refers to the content of gel material in a thermoplastic film formed because of cross-linking within the polymeric material. Gel content is expressed as a relative percent (by weight) of the polymer which—having formed insoluble carbon-carbon bonds between polymer chains due to cross-linking—is in a gel form. Gel content may be determined by ASTM D-2765-01 Test Method, which is incorporated herein by reference in its entirety or by the method described in the present experimental section.

DETAILED DESCRIPTION OF THE INVENTION

Figure 1:
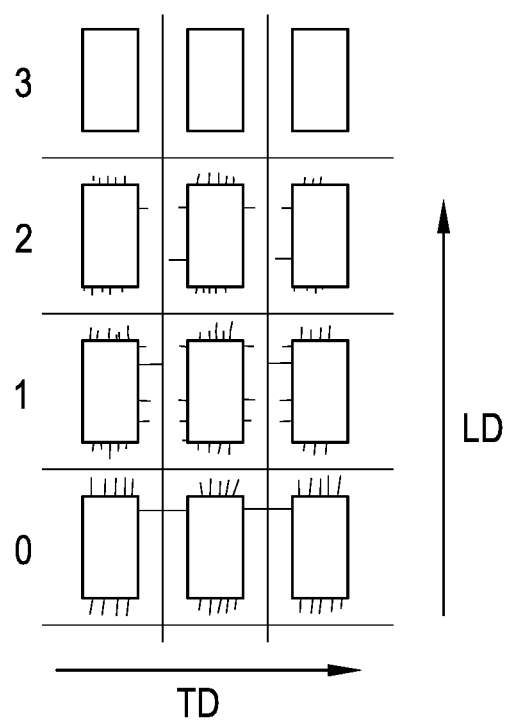
FIGS. 1, 2 and 3 show the sealing defects that may occur in a VSP packaging cycle, their denomination and score in the present formability test.

It is a first object of the present invention a cross-linked film suitable for use as top web in vacuum skin packaging comprising at least:
 an outer sealing layer a) comprising one or more (co)polyesters having a glass transition temperature (Tg) not higher than 50° C., preferably than 35° C., more preferably than 20° C. and/or a melting point temperature (Tm) not higher than 170° C., preferably than 160° C., more preferably than 150° C.,
 an outer abuse layer c) comprising one or more polymer(s) selected from the group consisting of polyolefins and their copolymers, polyamides, polyesters, styrene-based polymers and optionally
 a tie layer b) interposed between layer a) and c).

The sealing layer (a) is the outer layer of the multi-layer film that in the VSP packaging process will be in contact with the food product and will seal to the support.

The sealing layer a) comprises one or more (co)polyester(s) having a glass transition temperature (Tg) not higher than 50° C., preferably not higher than 35° C., more preferably not higher than 20° C. and/or a melting point temperature (Tm) not higher than 170° C., preferably not higher than 160° C., more preferably not higher than 150° C.

The glass transition temperature (Tg) and the melting point temperature (Tm) can be measured according to ASTM D 3418, which is incorporated herein by reference, by using differential scanning calorimeter. For the avoidance of doubt, as used herein, the Tg is the midpoint glass transition temperature measured according to ASTM D 3418 and Tm is the melting peak temperature measured according to ASTM D 3418.

The (co)polyester may be completely amorphous, partially or completely crystalline, providing that the relative Tg and/or Tm, fall within the ranges recited above.

The (co)polyester resin makes up at least 25%, at least 50% of the sealing layer, but preferably it is the major component of the sealing layer, preferably it makes at least 65%, preferably at least 80%, preferably at least 90%, more preferably at least 95% by weight of the total weight of the sealing layer, most preferably the sealing layer (a) consists of said (co)polyester only.

The (co)polyester resin(s) amount in the film according to the present invention is at least 2%, at least 4% wt, preferably at least 5% or 6% wt, even more preferable at least 7% wt, still more preferably at least 8% wt of the total weight of the film. The sealing layer a) may comprise an admixture of two or more (co)polyesters as defined above. In a preferred embodiment, the sealing layer consists of a (co)polyester material having a glass transition temperature (Tg) not higher than 50° C., preferably not higher than 35° C., more preferably not higher than 20° C. and/or a melting point temperature (Tm) not higher than 170° C., preferably not higher than 160° C., more preferably not higher than 150° C. or 140° C.

In another embodiment, the sealant layer comprise an admixture of at least a (co)polyester as defined above and at least another (co)polyester.

In a preferred embodiment, the sealant layer comprises a blend of (co)polyesters, more preferably consists of an admixture of (co)polyesters, wherein at least one (co)polyester has a Tg not higher than 50° C. and at least another (co)polyester has a Tg higher than 50° C.

Preferably, in said admixture, the another (co)polyester having a Tg higher than 50° C. is present in amount of at most 40% by weight.

The (co)polyester may also be an amorphous (co)polyester, i.e. a (co)polyester not having a defined melting point (m.p. or temperature of melting, herein Tm), but still complying with the above requirements in terms of Tg values.

The (co)polyester resin of the sealing layer (a) preferably derives from at least one aromatic dicarboxylic acid and at least one aliphatic dicarboxylic acid (or their lower alkyl diesters) with one or more glycol(s).

Preferred aromatic dicarboxylic acids include terephthalic acid, isophthalic acid, phthalic acid, and 2,5-, 2,6- or 2,7-naphthalenedicarboxylic acid, preferably the aromatic dicarboxylic acid is selected from isophthalic acid, phthalic acid, terephthalic acid and their admixtures, more preferably is phthalic acid, optionally admixed with traces of its isomers.

Preferred aliphatic dicarboxylic acids are saturated aliphatic dicarboxylic acids of the general formula CnH2n(COOH)2 wherein n is 2 to 8, such as succinic acid, sebacic acid, adipic acid, azelaic acid, suberic acid or pimelic acid, preferably sebacic acid, adipic acid and azelaic acid, and more preferably adipic acid. Preferably, the at least one aliphatic dicarboxylic acid is selected from saturated aliphatic dicarboxylic acids of formula CnH2n(COOH)2 wherein n is from 2 to 8, preferably from 4 to 8, more preferably wherein n=4, n=7 or n=8.

Preferred glycols are aliphatic or cycloaliphatic glycols, preferably an aliphatic glycols, and more preferably an alkylene glycols. Thus, suitable glycol(s) include aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol.

Preferred glycols are ethylene glycol and butanediol(s) and their admixtures, Preferred (co)polyesters are copolymers of isophthalic acid, phthalic acid, terephthalic acid and their admixtures with ethylene glycol, butanediol(s) and their admixtures.

The concentration of the aromatic dicarboxylic acid present in the copolyester is preferably no more than about 90 mole %, preferably no more than about 80 mole %, based on the dicarboxylic acid components of the copolyester.

The concentration of the aliphatic dicarboxylic acid present in the copolyester is preferably at least about 10 mole %, preferably at least about 20 mole %, based on the dicarboxylic acid components of the copolyester.

Particularly preferred examples of such copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; (iii) copolyesters of sebacic acid and terephthalic acid with an aliphatic glycol, preferably butylene glycol, (iv) copolyesters of phthalic acid and adipic acid with ethylene glycol and butane glycol (s).

Preferred polymers include a copolyester of sebacic acid/terephthalic acid/butylene glycol (preferably having the components in the relative molar ratios of 45-55/55-45/100, more preferably 50/50/100) having a glass transition point (Tg) of −40° C. and a melting point (Tm) of 117° C.), a copolyester of azelaic acid/terephthalic acid/ethylene glycol (preferably having the components in the relative molar ratios of 40-50/60-50/100, more preferably 45/55/100) having a Tg of −15° C. and a Tm of 150° C. and a copolyester of phthalic acid and adipic acid with ethylene glycol and butane glycol preferably having a Tg of 10° C. and a Tm of 125° C.

In the preferred embodiment, the Tg of the copolyester of the sealing layer is not higher than 20° C., preferably than 10° C. and the melting point Tm is not higher than 160° C., preferably than 150° C., and more preferably than 140° C.

Commercially available (co)polyester resins suitable for the sealing layer of the film of the present invention are Griltex ES702 by EMS (Tm 115-135° C., Tg 10° C., density 1.27 g/cc), Griltex ES703 by EMS (Tm 120-150° C., Tg 9° C., density 1.27 g/cc), Griltex ES502 by EMS (Tm 110-120° C., Tg −8° C., density 1.16 g/cc), Griltex D2547 by EMS (Tm 130° C.), Griltex D1874E by EMS (Tm 145-155° C., Tg 25° C.), Griltex D2551E by EMS (Tm 100° C., Tg −40° C.), Griltex D2368E by EMS (Tm 165-170° C., Tg −1° C.), Eastobond 19412 by Eastman Chemical (Tg 51° C.), the most preferred being Griltex ES702 by EMS, which is a copolyester comprising phthalic acid, adipic acid, ethylene glycol and butane diol and Griltex ES502 by EMS.

In a most preferred embodiment, the sealing layer comprises or consists of Griltex ES702 by EMS or of a blend between Griltex ES702 by EMS and Griltex D1874E by EMS.

In a most preferred embodiment, the sealing layer comprises or consists of a blend between Griltex ES502 by EMS and Eastobondn19412 by Eastman Chemical. Preferably, the sealing layer comprises one or more waxes. The wax assists in the manufacture by coextrusion of the film comprising the sealing layer referred to above.

The wax may be a natural or synthetic wax, and preferably has a melting point of at least 50° C. Natural waxes are preferably either vegetable waxes (such as carnauba wax) or mineral waxes (such as montan waxes and ozocerite). Paraffin waxes (highly-refined low-molecular weight waxes comprising straight-chain hydrocarbons) may also be used. Examples of synthetic waxes include Fischser-Tropsch waxes (produced by coal gasification, and having a molecular weight in the range from about 300 to about 1400 g/mol)), and oxidised and non-oxidised (preferably oxidised) low molecular weight polyethylene waxes (having a molecular weight in the range from about 500 to about 3000 g/mol) as well as the corresponding polypropylene waxes. However, a preferred class of waxes are amide waxes. Amidic waxes are generally immiscible with the base copolyester of the heat-sealable layer. The amide wax may be a primary, secondary, tertiary or bis (fatty) amide, such as oleamide and erucamide. Examples of the different types include primary fatty amides such as erucamide, behenamide, oleamide or stearamide; secondary fatty amides such as stearylerucamide, erucylerucamide, oleylpalmitamide, stearylstearamide or erucyistearamide; tertiary fatty amides such as dimethylstearamide or diethylstearamide; and N3N'-bis (fatty) amides such as N,N'-ethylene bis(stearamide), N,N'-methylene bis(stearamide), N,N'-propylene bis(stearamide), N,N'-ethylene bis(oleamide), N,N'-methylene bis (oleamide), or N,N'-propylene bis(oleamide). Preferably, the wax is selected from N,N'-bis (fatty) amides, and more preferably from N,N'-ethylene bis(oleamide) and N,N'-ethylene bis(stearamide).

The most preferred wax is erucamide.

In a preferred embodiment, the wax is present at a level of from about 0.01 to about 2 wt %, preferably from about 0.02 to about 1 wt %, preferably no more than 1 wt %, and typically from about 0.03 to about 0.5 wt % of the total weight of the sealing layer.

The sealing layer may advantageously comprise antiblock additives in an amount of from 0.01-2.0% wt, preferably 0.02-1.0%, even more preferably 0.03-0.5%.

Generally, antiblock additives are inorganic substances, silica being the most preferred.

Such inorganic fillers include conventional inorganic fillers, and particularly metal or metalloid oxides, such as alumina, silica (especially precipitated or diatomaceous silica and silica gels) and titanium dioxide, calcined clay and alkaline metal salts, such as the carbonates and sulphates of calcium and barium. Preferred particulate inorganic fillers include titanium dioxide and silica.

The thickness of the sealing layer is from 2 to 25 microns, preferably from 3 to 20 microns, more preferably from 4 to 15 microns, even more preferably from 5 to 12 microns.

The thickness of the sealing layer in relative percentage vs. the thickness of the whole films can range from 2 to 25%, preferably from 3% to 20%, more preferably 4 to 15%, even more preferably from 5 to 12%.

The sealing layer of the films according to the present invention advantageously allows during the vacuum skin packaging cycle to set up a dome temperature lower than 220° C., than 210° C., than 200°, than 190° C., than 180° C., than 170° C., than 160° C., even lower than 150° C. or as low as 140° C. or lower than 140° C.

The outer abuse layer c) is the layer of the film that will be in contact with the heated dome of the vacuum chamber in the VSP process.

The outer abuse layer c) comprises one or more polymer(s) selected from the group consisting of polyolefins and their copolymers, polyamides, polyesters and styrene-based polymers.

The outer abuse layer c) comprises one or more polymer(s) selected from the group consisting of polyolefins and their copolymers, polyamides, polyesters and styrene-based polymers in an amount of at least 50% wt of the weight of layer c), even more preferably at least 65%, at least 80%, at least 90% or at least 95%.

In the preferred embodiment, the outer abuse layer c) consists of one or more polymer(s) selected from polyolefins and their copolymers, polyamides, polyesters and styrene-based polymers.

Polyolefin refers to any polymerized or co-polymerized olefin that can be linear, branched, or cyclic, substituted or unsubstituted, and possibly modified. Resins such as polyethylene, ethylene-alpha-(C4-C8)olefin copolymers, ethylene-propylene copolymers, ethylene-propylene-alpha-(C4-C8)olefin ter-polymers, propylene-butene copolymer, polybutene, poly(4-methyl-pentene-1), ethylene-propylene rubber, butyl rubber, as well as copolymers of ethylene (or a higher olefin) with a comonomer which is not an olefin and in which the ethylene (or higher olefin) monomer predominates such as ethylene-vinyl acetate copolymers, ethylene-acrylic acid copolymers, ethylene-alkyl acrylate copolymers, ethylene-methacrylic acid copolymers, ethylene-alkyl methacrylate copolymers, ethylene-alkyl acrylate-maleic anhydride copolymers, ionomers, as well the blends thereof in any proportions are all included. Also included are the modified polyolefins, where the term "modified" is intended to refer to the presence of polar groups in the polymer backbone. The above polyolefin resins can be "heterogeneous" or "homogeneous", wherein these terms refer to the catalysis conditions employed and as a consequence thereof to the particular distribution of the molecular weight, branched chains size and distribution along the polymer backbone, as known in the art.

The preferred resins for the outer abuse layer of the film according to the first object of the present invention are polyolefins as herein defined, particularly ethylene homo- and co-polymers, propylene homo- and co-polymers and ionomers, or polyamides or (co)polyesters, i.e. PET-G, or styrene-based polymer and their admixtures.

Layer c) preferably comprises ionomers, MDPE and HDPE, more preferably HDPE. Generally suitable melting points are higher than 108° C., preferably higher than 120° C.

Exemplary HDPE resins for the outer abuse layer are RIGIDEX HD6070FA by Ineos, Surpass HPs667-AB by Nova Chemicals, antiblock HDPE grade 102804 by Ampacet.

Suitable MDPE is DOWLEX SC2108G by Dow.

Exemplary ionomers are Surlyn 1601 and Surlyn 1650 (DuPont).

Suitable polypropylene copolymer is grade RB307MO by Borealis.

The term "polyamides" includes aliphatic homo- or co-polyamides commonly referred to as e.g. polyamide 6, polyamide 69, polyamide 610, polyamide 612, polyamide 11, polyamide 12, polyamide 6/12, polyamide 6/66, polyamide 66/610, modifications thereof and blends thereof. Said term also includes crystalline or partially crystalline, aromatic or partially aromatic, polyamides, such as polyamide 6I/6T or polyamide MXD6.

Crystalline polyamides for the film of the present invention are those polyamides whose melting point is preferably within the range from about 130 to 230° C., more preferably from about 160 to 220° C., even more preferably from about 185 to 210° C. Suitable crystalline polyamides comprise crystalline homo-polyamides and co-(or ter-) polyamides, preferably selected among PA6; PA6.6; PA6.66; PA66.6; PA6.12; PA6.66.12; PA12; PA11; PA6.9; PA6.69; PA6.10; PA10.10; PA66.610; PA MXD6/MXDI, more preferably selected among PA6; PA6.66; PA66.6; PA6.12; PA6.66.12; PA12; PA11; PA6.9; PA MXD6/MXDI, even more preferably among PA6; PA6.66; PA6.12; PA6.66.12; PA12; PA11, most preferably being said crystalline polyamide PA6.66, and blends thereof.

Suitable polyamides are ULTRAMID C33 L 01 supplied by BASF (PA6/66), Terpalex (PA6/66/12) and Grilon CF6S supplied by EMS (PA 6/12).

The term "polyesters" for the outer abuse layer refers to polymers obtained by the polycondensation reaction of dicarboxylic acids with dihydroxy alcohols. Suitable dicarboxylic acids are, for instance, terephthalic acid, isophthalic acid, 2,6-naphthalene dicarboxylic acid and the like. Suitable dihydroxy alcohols are for instance ethylene glycol, diethylene glycol, 1,4-butanediol, 1,4-cyclohexanedimethanol and the like. Examples of useful polyesters include poly(ethylene 2,6-naphtalate), poly(ethylene terephthalate), and copolyesters obtained by reacting one or more dicarboxylic acids with one or more dihydroxy alcohols, such as PETG which is an amorphous co-polyesters of terephthalic acid with ethylene glycol and 1,4-cyclohexanedimethanol.

Preferably, suitable polyesters for the outer layer have a Tg higher than 70° C., than 75° C. or than 77° C. Suitable polyesters are Ramapet N180 and Ramapet N1 by Indorama or Artenius PET Global by Artenius or Eastar PETG 6763 by Eastman.

As used herein, the phrase "styrene-based polymer" refers to at least one polymer selected from the group consisting of polystyrene, styrene-ethylene-butylene-styrene copolymer, styrene-butadiene-styrene copolymer, styrene-isoprene-styrene copolymer, styrene-ethylene-butadiene-styrene copolymer, and styrene-(ethylene-propylene rubber)-styrene copolymer. As used herein the use of a "dash" (i.e., the "-") in a styrene-based polymer formula, is inclusive of both block copolymers and random copolymers. More particularly, the phrase "styrene-based polymer" includes both copolymers in which (i) all named monomers are present as a block, or (ii) any subset of the named monomers are present as a block with the remaining monomers being randomly arranged, or (iii) all named monomers are randomly arranged.

The term "polystyrene" as used herein refers to film grade homopolymers and copolymers of styrene and its analogs and homologs, including -methyl-styrene and ring-substituted styrenes, such as for instance ring-methylated styrenes. This term "polystyrene polymer" is used to identify single polymers or blends of different polystyrene polymers as indicated above.

Particularly preferred polystyrene resins are Styrolux 684D by BASF and Polystyrol 143E by BASF or "K resin KR53" by "Chevron Phillips Chemicals" which can be used either alone or in blend.

The thickness of the outer abuse layer is from 2 to 25 microns, preferably from 3 to 20 microns, more preferably from 4 to 15 microns, even more preferably from 5 to 12 microns.

The thickness of the outer abuse layer in relative percentage vs. the thickness of the whole films can range from 2 to 25%, preferably from 3% to 20%, more preferably 4 to 15%, even more preferably from 5 to 12%.

The amount of the resin of the abuse layer in the film according to the present invention is at least 3% wt, preferably at least 5% wt, even more preferable at least 6% wt of the total weight of the film.

The films of the present invention preferably comprise an inner barrier layer d).

The barrier layer d) according to the present invention comprises PVDC, polyamides, such as PA MXD6/MXDI, EVOH, polyesters, and blends thereof, preferably EVOH, optionally blended with polyamides.

The thickness of the gas-barrier layer d) will be set in order to provide the overall multi-layer sheet with the optimal Oxygen Transmission Rate (OTR), lower than 500 $cm^3/m^2 \cdot day \cdot atm$, preferably lower than 100, more preferably lower than 10, even more preferably lower than 7, when measured at 23° C. and 0% of relative humidity (evaluated by following the method described in ASTM D-3985 and using an OX-TRAN instrument by Mocon).

The at least one inner gas barrier layer d) of the present films comprises at least 70%, at least 80%, at least 90%, at least 95% of ethylene vinyl alcohol.

Preferably, EVOH is used as the only component of the barrier layer.

Typically, when EVOH is employed as the only gas-barrier material, this is generally achieved with a thickness between 3 and 20, preferably between 4 and 15, more preferably between 5 and 13 microns. Thicker layers may be used if desired or if a lower OTR is needed.

Exemplary commercial EVOH resins are E171B, EVAL F101B or EVAL G156B by Evalca/Kuraray, SOARNOL AT4403 and SOARNOL ET3803 by Nippon Gohsei.

The films of the present invention may comprise at least one polyamide layer e) adhered to said barrier layer d) or two layers e) adhered to the opposite surfaces of the barrier layer d). Said at least one or, preferably, two layer(s) e), are preferably directly adhered to the barrier layer d), i.e. without any interposed tie layer.

Said polyamide layer e) mainly comprises crystalline polyamides, generally in amount higher than 60% by weight of said layer composition, preferably higher than 80%, more preferably higher than 90%, even more preferably higher than 95%. Most preferably said polyamide layer e) consists of crystalline polyamides only.

With crystalline polyamides, a single crystalline polyamide or a blend or two or more crystalline polyamides is to be intended, preferably a single crystalline polyamide is intended.

The balance to 100% by weight of the composition of layer e) may be represented by suitable blendable thermoplastic materials or additives, such as for example ionomer-nylon alloy produced by Du Pont and commercialized under the tradename of Surlyn AM7927, provided that amorphous polyamides are not included.

Crystalline polyamides according to present invention are those polyamides whose melting point is preferably within the range from about 130 to 230° C., more preferably from about 160 to 220° C., even more preferably from about 185 to 210° C.

Crystalline polyamides according to present invention comprise crystalline homo-polyamides and co-(or ter-) polyamides, preferably selected among PA6; PA6.6; PA6.66; PA66.6; PA6.12; PA6.66.12; PA12; PA11; PA6.9; PA6.69; PA6.10; PA10.10; PA66.610; PA MXD6/MXDI, more preferably selected among PA6; PA6.66; PA66.6; PA6.12; PA6.66.12; PA12; PA11; PA6.9; PA MXD6/MXDI, even more preferably among PA6; PA6.66; PA6.12; PA6.66.12; PA12; PA11, most preferably being said crystalline polyamide PA6.66, and blends thereof.

Crystalline polyamides according to the present invention are preferably selected within the polyamides listed above, more preferably within those polyamides listed above having melting points falling within the range preferably from about 140 to 230° C., more preferably from about 160 to 220° C., even more preferably from about 185 to 210° C.

The thickness of said at least one polyamide layer e) is generally between 2 and 14 microns, preferably between 3 and 10, even more preferably between 4 and 6.

In the preferred embodiment comprising two polyamide layers e) directly adhered to the opposite surfaces of the barrier layer d) the thickness of each layer is generally between 1 and 7 microns, preferably between 1.5 and 6, even more preferably between 2 and 5.

One or more inner bulk layer(s) or "structural" layer(s) f) can be advantageously present in the film of the present invention.

They generally comprises polymers used to improve the abuse or puncture resistance of the film or just to provide the desired thickness.

However, in VSP applications, these layers are also important to impart the required formability.

Polymers suitable for these layers are typically ethylene homo- and co-polymers, e.g. low density polyethylene, ethylene-vinyl acetate copolymers, linear low density polyethylenes, linear very low density polyethylenes and ionomers, preferably ionomers and ethylene-vinyl acetate copolymers, more preferably ethylene-vinyl acetate copolymers.

Particularly preferred LDPE resin is LD158BW by ExxonMobil.

Preferred ethylene-vinyl acetate copolymers are ELVAX 3165 by DuPont and ESCORENE ULTRA FL00119, by ExxonMobil.

Preferred ionomers include Surlyn 1601 and Surlyn 1650 by Du Pont.

Preferably, the films of the present invention comprise two bulk layers f) positioned on the opposite sides and with respect to the barrier layer d), but not necessarily in contact with said layer d), said bulk layers comprising preferably the same polymers, more preferably ethylene-vinyl acetate copolymers.

The thickness of the bulk layer(s) f) that is present in the overall structure will depend mainly on the overall thickness desired for the film. Said thickness can be expressed as a percentage of the total thickness of the present film, and it generally ranges between 30 and 80%, preferably between 35 and 70%, more preferably between 40 and 60%.

The resin(s) of the bulk layer can be advantageously present in the film of the present invention in an amount of at least 25% wt, preferably at least 40% wt, even more preferably at least 60% wt, based on the total weight of the film.

Other layers that may be optionally present in the multi-layer film of the invention are tie or adhesive layers b) that are employed to better adhere one layer to another in the overall structure. In particular the film may include tie layer(s) b) directly adhered (i.e., directly adjacent) to one or both sides of the internal barrier layer d) and/or to one or both sides of polyamide layer(s) e) to better adhere said polyamide layer(s) e) to the adjacent bulk layer(s) d). Additional tie layers may also be used to better adhere said bulk layer(s) d) to the adjacent sealing layer a) and/or outer abuse layer c).

The composition of layer a) and c) can be adjusted by the skilled in the art such that a tie layer b) does not need to be present in direct contact with both layers a) and c). In such a case, the basic structure of the film of the present invention can be referred to as sequence a/c, wherein "a" indicate layer a) and "c" means layer c).

If present, the tie layer b) can be used to adhere sealing layer a) to the outer abuse layer c), in the layer sequence a/b/c.

Tie layers may include polymers having grafted polar groups so that the polymer is capable of covalently bonding to polar polymers such as EVOH or polyamides. Useful polymers for tie layers include ethylene-unsaturated acid copolymers, ethylene-unsaturated ester copolymers, anhydride-modified polyolefins, polyurethane, and mixtures thereof. Preferred polymers for tie layers include one or more of thermoplastic polymers such as ethylene-vinyl acetate copolymers with high vinyl acetate content (e.g. 18-28 wt. % or even more), ethylene-(meth)acrylic acid copolymers, ethylene homo-polymers or co-polymers, modified with anhydride or carboxylic acid functionalities, blends of these resins or blends of any of the above resins with an ethylene homo- or co-polymer, and the like known resins.

Commercial tie resins particularly suitable for EVOH layer are OREVAC 18303 and OREVAC 18300 by Arkema and BYNEL 4125 by DuPont.

Tie layers are of a sufficient thickness to provide the adherence function, as is known in the art. Their thickness is generally comprised between 2 and 20 microns, preferably 3 to 13 microns.

Preferably, the multilayer film of the invention has a total content of (co)polyesters lower than 20%, than 15% or than 10% by weight with respect to the whole film weight.

One or more of any of the layers of the multilayer film of the present invention may include appropriate amounts of additives typically included in structures for food packaging for the desired effect, as it is known to those of skill in the packaging films art. For example, a layer may include additives such as slip agents, antiblock agents, antioxidants, fillers, dyes and pigments, cross-linking enhancers, cross-linking inhibitors, radiation stabilizers, oxygen scavengers, antistatic agents, and the like agents.

Generally, the layers sequence of the films of the present invention can be selected among the following non exhaustive list: a/c, a/b/c, a/b/d/b/c, a/f/d/f/c, a/b/f/d/f/b/c, a/b/f/b/d/b/f/b/c, a/b/f/b/d/b/f/c, a/b/f/d/b/f/c, a/b/f/b/d/f/b/c, a/f/b/d/b/f/c, a/b/e/d/e/b/c, a/f/e/d/e/f/c, a/b/f/e/d/e/f/b/c, a/b/f/b/e/d/e/b/f/b/c, a/b/f/b/e/d/e/b/f/c, a/b/f/e/d/e/b/f/c, a/b/f/b/e/d/e/f/b/c, a/f/b/e/d/e/b/f/c, a/f/b/d/e/d/b/f/c.

Where the multi-layer film representation above includes the same letter more than once, each occurrence of the letter may represent the same composition or a different composition within the class that performs a similar function.

The film according to the first object of the present invention is characterized by a thickness lower than 180 microns, preferably lower than 150 microns, more preferably lower than 130 microns, even more preferably lower than 110 microns, 100 microns, 90 microns, 80 microns or 70 microns.

For use as VSP top web the film of the present invention has preferably a total thickness of from about 25 to about 180 microns, preferably from about 30 to about 150 microns, more preferably from about 40 to about 120 microns.

In particular for VSP, thicker films will be used for packaging products of higher profile while thinner film are sufficient and preferred in order to vacuum skin package products with a shallow profile. In particular, thicker films i.e. 100 microns or more, are suitable for demanding applications like packaging of high profile products and/or with irregular and sharp surfaces, such as bone-in meat or frozen products or crabs and the like.

The films of the present invention are advantageous with respect to current VSP films on the market, providing comparable performances with lower thicknesses.

The film of the present invention may include any number of layers from 2 to 13, layers, from 3 to 11, preferably from 5 to 9 layers and more preferably form 7 to 9 layers.

Preferable, the films of the present invention have at least 3, at least 4, at least 5, at least 6, at least 7 layers.

The films of the present invention are cross-linked.

As used herein, the term cross-linked means that at least a part of the present film is cross-linked. Preferably, all the layers of the present film are cross-linked.

Cross-linking may be imparted chemically or physically as described herein after. Cross-linking of one or more layers or of the entire thermoplastic film may be assessed by measuring the gel content or the melt flow index as explained in the present description. The films according to the present invention have an unrestrained linear thermal shrinkage (free heat-shrinkage) at 160° C. (measured in oil) in both the machine and transverse directions of less than 15%, more preferably less than 10%, even more preferably lower than 5% as measured according to ASTM D-2732 Test Method, which is incorporated herein by reference in its entirety. The films according to the present invention have an unrestrained linear thermal shrinkage at 160° C., 180° C. and 200° C. (measured in air, by using an internal method herein described) in both the machine and transverse directions of less than 20%, preferably less than 15%, even more preferably less than 10%.

The multilayer VSP film of the invention, or at least a part of it including one or more of the thermoplastic layers thereof, are cross-linked, as described in details for the manufacturing process of the film according to the first object of the present invention, to such a level that:

the whole film—if before cross-linking all the polymers making the film are toluene-soluble—or at least the part of the film made of polymers which before cross-linking are toluene-soluble, has a gel content of not less than 25%, preferably not less than 40%, more preferably not less than 60%, as measured in accordance with the internal test method described in the Experimental Part and/or the whole film has a melt flow index (MFI), measured at 230° C., 21.6 kg, according to ASTM D-1238, which is incorporated herein by reference in its entirety, not higher than 3 g/10 min, preferably not higher than 2 g/10 min, more preferably not higher than 1 g/10 min, even more preferably about 0 g/10 min and/or the whole film has a melt flow index (MFI), measured at 230° C., 2.16 kg, according to ASTM D-1238, which is incorporated herein by reference in its entirety, not higher than 2 g/10 min, preferably not higher than 1 g/10 min, even higher preferably about 0 g/10 min.

Considering for instance the 9 layers films of Table 4a, the toluene-soluble part of said films refers to the portion including layers from 6 to 9.

Preferably, the film of the present invention has been irradiated through all its layers (all cross-linked film).

As used herein, the term "soluble in toluene" or "toluene-soluble" refers to a solubility of at least 1.25 g/l at the boiling temperature of toluene (about 110° C., at standard pressure of 1 atm, measured after boiling the sample in toluene for 30 minutes).

The preferred (co)polyesters used in the seal layer of the present films are generally soluble in toluene (e.g. Griltex ES 703, Griltex ES 702, Griltex D 2547 and Griltex ES 502).

The film according to the present invention has an implosion resistance, measured by following the test method provided herein (Experimental part), of at least 8 mm, preferably at least 10 mm, even more preferably at least 12 mm, still more preferably at least 13 mm.

The film according to the present invention have a very good formability, in particular such film exhibits a score for both webbing and bridging (longitudinal, transverse and circular) measured by following the test method provided herein (Experimental part) of at least 2, preferably at least 2.5, even more preferably at least 2.8. Finally, the films according to the first object of the present invention can be printed by common method known in the art.

Preferably, the films according to the present invention are not oriented.

In case they are oriented, they are heat-set to result in not heat-shrinkable films as herein defined.

The films according to the present invention are not heat-shrinkable as herein defined.

A second object of the present invention is a vacuum skin package comprising a support, a product loaded onto said support and a top film according to the first object of the present invention, said film being draped over the product and sealed over the entire surface of the support not covered by the product.

The support may be flat or hollow, e.g. tray-shaped. If shaped, the support may be thermoformed in-line or may be an off-line pre-made tray.

The support is typically a rigid, semi-rigid material or in alternative a flexible material.

The support can be a mono- or a multilayer material.

Preferably, the support is made of a multilayer material comprising, in addition to a heat-sealable layer to allow sealing of the skin film to the part of the support not covered by the product, at least one bulk layer to provide good mechanical properties.

The support may include a sealing layer.

The resin of the sealing layer may be selected among the modified or unmodified polyolefins as herein defined, such as ethylene homo- or co-polymers, propylene homo- or co-polymers, ethylene/vinyl acetate copolymers, ethylene-acrylic acid copolymers, ethylene-alkyl acrylate copolymers, ethylene-methacrylic acid copolymers, ethylene-alkyl methacrylate copolymers, ethylene-alkyl acrylate-maleic anhydride copolymers, ionomers. Suitable sealing layers may also include peelable blends (also named frangible blends, which are blends of immiscible polymers known in the art of packaging) to provide the package with an easy-to-open feature. The film of the invention is preferably used in combination with a support having a sealing layer comprising ethylene/vinyl acetate copolymers, ethylene-acrylic acid copolymers, ethylene-alkyl acrylate copolymers, ethylene-methacrylic acid copolymers, ethylene-alkyl methacrylate copolymers, ethylene-alkyl acrylate-maleic anhydride copolymers as above defined or polyesters.

More preferably, the sealing layer of the support to be sealed to the film of the present invention comprises ethylene/vinyl acetate copolymers or polyesters, most preferably polyesters (for instance. APET, CPET and PETg).

Useful propylene copolymers include propylene/ethylene copolymers (EPC), which are copolymers of propylene and ethylene having a majority weight percent content of propylene, and propylene/ethylene/butene terpolymers (EPB), which are copolymers of propylene, ethylene and 1-butene.

In a number of applications, the support is also required to have gas barrier properties, in particular oxygen barrier properties. Thus, in addition to a bulk and a sealing layer, the support is provided with a gas barrier layer. The thickness of the gas barrier layer will be typically set in order to provide the support material with an oxygen transmission rate lower than 30, lower than 15, preferably lower than 10 $cm^3/m^2 \cdot d \cdot atm$ (as measured according to ASTMD-3985 at 23° C. and 0% relative humidity).

Suitable thermoplastic materials with low oxygen transmission characteristics to provide packaging materials with gas barrier properties are PVDC, EVOH, polyamides, polyesters or blends thereof.

PVDC is any vinylidene chloride copolymer wherein a major amount of the copolymer comprises vinylidene chloride and a minor amount of the copolymer comprises one or more unsaturated monomers copolymerisable therewith, typically vinyl chloride, and alkyl acrylates or methacrylates (e.g. methyl acrylate or methacrylate) and the blends thereof in different proportions. Generally, a PVDC barrier layer will contain plasticisers and/or stabilizers as known in the art.

EVOH is the saponified product of ethylene-vinyl ester copolymers, generally of ethylene-vinyl acetate copolymers, wherein the ethylene content is typically comprised between 20 and 60% by mole and the degree of saponification is generally higher than 85% preferably higher than 95%.

The term "polyamides" includes aliphatic homo- or co-polyamides commonly referred to as e.g. polyamide 6, polyamide 69, polyamide 610, polyamide 612, polyamide 11, polyamide 12, polyamide 6/12, polyamide 6/66, polyamide 66/610, modifications thereof and blends thereof. Said term also includes crystalline or partially crystalline, aromatic or partially aromatic, polyamides, such as polyamide 6I/6T or polyamide MXD6.

The term "polyesters" in relation to the support sealing layer composition refers to polymers obtained by the polycondensation reaction of dicarboxylic acids with dihydroxy alcohols. Suitable dicarboxylic acids are, for instance, terephthalic acid, isophthalic acid, 2,6-naphthalene dicarboxylic acid and the like. Suitable dihydroxy alcohols are for instance ethylene glycol, diethylene glycol, 1,4-butanediol, 1,4-cyclohexanedimethanol and the like. Examples of useful polyesters include poly(ethylene 2,6-naphtalate), poly(ethylene terephthalate), and copolyesters obtained by reacting one or more dicarboxylic acids with one or more dihydroxy alcohols, such as PETG which is an amorphous co-polyesters of terephthalic acid with ethylene glycol and 1,4-cyclohexanedimethanol.

Additional layers, such as tie layers, to better adhere the gas barrier layer to the adjacent layers, may be present in the bottom web material for the support and are preferably present depending in particular on the specific resins used for the gas barrier layer.

In case of a multilayer structure, part of it can be foamed and part can be un-foamed. For instance, the support may comprise (from the outermost layer to the innermost food-contact layer) one or more structural layers—typically of a material such as polystyrene, polyester, poly(vinyl chloride), polypropylene, paper or cardboard—a gas barrier layer and a sealing layer.

The support for the package according to the present invention may be polystyrene-based.

The support for the package according to the present invention may be polyester-based.

Such support may be monolayer or multilayer material. They comprise a polyester, preferably a material selected from the group consisting of polyethylene terephthalate (PET), crystalline polyethylene terephthalate (CPET), amorphous polyethylene terephthalate (APET), polyethylene terephthalate glycol (PETg), and blends thereof. In one embodiment, such support is monolayer material.

In other embodiments, the surface of the support in contact with the product, i.e. the surface involved in the formation of the seal with the lidding film, comprises a polyester resin, usually an amorphous polyester resin (APET). For instance, the container can be made of cardboard coated with polyester or it can be integrally made of a polyester resin.

Examples of suitable supports for the package of the invention are CPET, APET, APET/CPET, either foamed or un-foamed (i.e. solid), or suitably coated i.e. made sealable—cardboard or aluminium supports.

The support of the VSP package according to the invention may comprise a surface made of aluminum.

In one embodiment, the support can be uncoated aluminium.

Suitable aluminum supports are for instance the aluminum trays marketed by Cuki, described in the experimental part.

As an alternative, the support may be a multilayer structure having at least a surface layer comprising or consisting of aluminum.

In one embodiment, the support is compostable, for instance it may include a bulk layer of a biodegradable resin—such as polylactic acid derivatives—and a sealing layer of e.g. PETG.

Preferably, the compostable support is made of polylactic acid and derivatives thereof.

As used herein, the term "biodegradable" refers to a product or a material that has the ability to break down, safely and relatively quickly, by biological means, into the raw materials of nature and disappear into the environment. These products can be solids biodegrading into the soil (which we also refer to as compostable), or liquids biodegrading into water. Biodegradable plastic is intended to break up when exposed to microorganisms.

As used herein, the term "compostable" refers to a product that can be placed into a composition of decaying biodegradable materials, and eventually turned into a nutrient-rich material. It is almost synonymous with "biodegradable", except it is limited to solid materials and does not refer to liquids.

In one embodiment, the support is made of steel, preferably is a flat steel support.

As an alternative, the steel support may be hollow, e.g. a tray, a baking tray, a roasting pan or a pot.

As used herein, made of still refers to a support in which at least 70%, 80% 90%. 95% or more of the support weight is steel.

Steel is the material of the pans that are used in canteens and industrial kitchens.

The steel support can be advantageously closed under VSP packaging conditions with a film of the present invention as top web, thus enclosing a product, preferably a food product, more preferably a ready meal.

Advantageously, thanks to the present films, it is thus possible to prepare a meal and to package it, directly in the same container, thus extending its shelf-life and allowing a delayed distribution to the users, when needed.

The supports to be used in combination to the film according to the first object of the present invention can be pigmented.

The overall thickness of the support will typically be up to 8 mm, preferably it will be comprised between 0.08 and 7 mm and more preferably between 0.1 and 6 mm.

Food products that can be advantageously packaged by using the films according to the first object of the present invention and the above mentioned support are, in a no limiting list, fish, meat, particularly fresh red meat, poultry, cheese, ready-meals. Food products, which release significant amount of fluids when packaged in VSP packages, such as for instance chicken breasts, particularly benefit of the drip retention performance of the VSP packages of the present invention. Preferably, the VSP packages of the present invention are microwaveable as previously defined. In case of microwave applications, solid supports comprising a polymer with a relatively high melting point such as polypropylene, polystyrene, polyamide, 1,4-polymethylpentene or crystallized polyethylene terephthalate (CPET) are preferred. Solid polypropylene is particularly preferred because of its strength, its ability to support a food product, and its relatively high melting point. Other materials will be more or less desirable for microwave applications depending on their physical characteristics such as those described above.

A third object of the present invention is a vacuum skin packaging process in which the top skin film is the film according to the first object of the present invention. The VSP process comprises the steps of placing a product loaded support in a vacuum chamber, positioning the VSP film of the present invention above the product loaded support, allowing the VSP film to drape itself over the product and to seal over the entire surface of the support not covered by the product to obtain a vacuum skin package.

In more detail, the skin-forming film of the present invention is fed to the upper section of a heated vacuum chamber comprising an upper and a lower section, and a vacuum is applied thereto from the outside, thereby drawing the skin-forming film into a concave form against the inwardly sloping walls of the upper section of the chamber and against the ports contained in the horizontal wall portion thereof (the top of the dome). Any conventional vacuum pump can be used to apply the vacuum and, preferably, the skin-forming film is suitably pre-heated prior to the foregoing operation to render it more formable and thus better able to assume a concave shape in the upper section of the vacuum chamber.

Preferably, with Rollstock machines, pre-heating of the films of the present invention is performed at temperatures lower than 140° C., than 120° C., than 110° C., more preferably at temperatures of about 100° C.

The product to be packaged is positioned on a support member that can be flat or shaped, typically tray-shaped, and placed on a platform that is carried in the vacuum chamber, in the lower section thereof, just below the dome. The support member can be shaped off-line or, alternatively, in-line at an initial station on the vacuum packaging machine. Then the vacuum chamber is closed by moving the upper section down onto the lower one and during this whole sequence of operations vacuum is constantly applied to retain the concave shape of the film. Once the vacuum chamber is closed, vacuum is applied also in the lower section of the vacuum chamber in order to evacuate the space between the support member and the top skin-forming film. Vacuum in the upper section of the vacuum chamber continues to be applied to retain the concave shape of the skin-forming film until the area between the support and the skin-forming film is evacuated, then it is released and atmospheric pressure is admitted. This will collapse the softened top skin-forming film over the product and the support, as the atmosphere pushing the skin-forming film from the top and the vacuum pulling it from the bottom will cooperatively work to have the skin-forming film substantially conform to the shape of the product to be packaged on the support member. Optionally, after the evacuation step has been completed, a suitably selected purging gas or gas mixture could be flushed over the product to generate a very low residual gas pressure into the package. In some rare instances heat-sealing bars or other sealing means can be present in the vacuum chamber to carry out a perimeter heat-seal of the skin-forming film to the support member.

As mentioned, the support member can be shaped off-line and in such a case the used VSP machine is referred to as a Tray Skin machine or, alternatively, the support member can be shaped in-line at an initial station on the vacuum packaging machine that is called "Rollstock" machine.

Preferred machine for the process according to the third object of the present invention are supplied by Multivac, Mondini, Sealpac and Ulma.

A recently developed skin packaging process is described in WO2009141214, EP2722279, EP2459448. In such process, the support to be used for the vacuum skin process is perforated in order to get a more efficient vacuum. Such process can be performed by using, for example, machine TRAVE E340, Trave 1000 Darfresh or Trave 590XL Darfresh by Mondini. Herein, this peculiar VSP process on perforated trays is also named Darfresh On tray.

The sealing layer of the films according to the present invention advantageously allows during the vacuum skin packaging cycle to set up a dome temperature lower than 220° C., than 210° C., than 200°, than 190° C., than 180° C., than 170° C., than 160° C., even lower than 150° C., or as low as 140° C.

A fourth object of the present invention is the use of a film according to the first object of the present invention as a top web for vacuum skin packaging applications. Preferably, said film is characterized by a thickness generally lower than 180 microns, preferably lower than 150 microns, more preferably lower than 130 microns, even more preferably lower than 110 microns.

The film of the invention is preferably used in combination with a support having a sealing layer comprising polyolefins as herein defined, such as ethylene homo- or co-polymers, propylene homo- or co-polymers, ethylene/vinyl acetate copolymers, ethylene-acrylic acid copolymers, ethylene-alkyl acrylate copolymers, ethylene-methacrylic acid copolymers, ethylene-alkyl methacrylate copolymers, ethylene-alkyl acrylate-maleic anhydride copolymers, ionomers or polyesters.

More preferably, the sealing layer of the support to be sealed to the film of the present invention comprises ethylene/vinyl acetate copolymers or polyesters.

The film of the invention is preferably used with CPET, APET and APET/CPET, either foamed or un-foamed, i.e. solid, or coated cardboard or aluminium supports, as previously defined. Such support can be flat or shaped (hollow) i.e. tray-shaped. The films of the present invention can be made by a coextrusion process as described in U.S. Pat. No. 4,287,151 that involves coextrusion through a round extrusion die, such process being the preferred one.

The films according to the present invention can also be manufactured by a flat cast coextrusion process through a flat extrusion die. Suitable round or flat sheet multilayer coextrusion dies for coextruding the films of the invention are well known in the art.

The multilayer VSP films of the invention, or only one or more of the thermoplastic layers thereof, are cross-linked, to such a level that:
  the whole film—in case all the polymers making the film before cross-linking are toluene-soluble—or at least the part of it made of polymers which before cross-linking are toluene-soluble, comprises a gel content of not less than 25%, preferably not less than 40%, more preferably not less than 60%, as measured in accordance with the internal test method described in the Experimental Part and/or
  the whole film has a melt flow index (MFI), measured at 230° C., 21.6 kg, according to ASTM D-1238, which is incorporated herein by reference in its entirety, not higher than 3 g/10 min, preferably not higher than 2 g/10 min, more preferably not higher than 1 g/10 min, even more preferably about 0 g/10 min and/or
  the whole film has a melt flow index (MFI), measured at 230° C., 2.16 kg, according to ASTM D-1238, which is incorporated herein by reference in its entirety, not higher than 2 g/10 min, preferably not higher than 1 g/10 min, even higher preferably about 0 g/10 min.

The films of the present invention can be crosslinked by any chemical or low or high radiation method or combination thereof.

The preferred method of crosslinking is by electron-beam irradiation, which is well known in the art. One skilled in the art can readily determine the radiation exposure level suitable for a particular application. Generally, however, radiation dosages of up to about 250 kGy are applied, typically between about 80 and about 240 kGy, with a preferred dosage of between 90 and 220 kGy.

The manufacturing process of the present films preferably does not include any orientation step.

In case it does, this is preferably followed by a heat-setting step that significantly reduce or preferably eliminate any heat shrinkage.

Preferably, the manufacturing process of the present films does not include any orientation and any heat-setting step.

EXPERIMENTAL PART

Examples

The following examples are presented for the purpose of further illustrating and explaining the present invention and are not to be taken as limiting in any regard. Unless otherwise indicated, all parts and percentages are by weight.

All the films of the examples and of comparative examples were manufactured via round cast coextrusion followed by cross-linking by electron-beam irradiation at 220 KGys, unless otherwise stated.

Finally, the obtained films were cooled with water at 15° C. and wound on rolls.

Table 1 reports the resins used for the manufacturing of the films and Table 2 to 4 the films compositions for the example and the comparative examples.

TABLE 1

| Trade name | Supplier | Chemical Nature | Acronym | Analysis | Value | Units |
|---|---|---|---|---|---|---|
| ELVAX 3165 | DuPont | Ethylene/Vinyl Acetate Copolymer | EVA1 | Density | 0.940 | g/cc |
| | | | | MFR (190° C./02.16 kg) | 0.70 | g/10 min |
| | | | | m.p. | 87.0 | ° C. |
| | | | | Vicat s.p. | 69.0 | ° C. |
| | | | | Comonomer content | 18.00 | % |
| ELVALOY 741 | DuPont | Modified Ethylene/Vinyl Acetate Copolymer | EVA2 | Density | 1 | g/cc |
| | | | | Comonomer content | 24 | % |
| | | | | m.p. | 66.00 | ° C. |
| ESCORENE ULTRA FL00909 | ExxonMobil | Ethylene/Vinyl Acetate Copolymer | EVA3 | Density | 0.9280 | g/cc |
| | | | | MFR (190° C./02.16 kg (E) | 9 | g/10 min |
| | | | | Comonomer content | 9.4 | % |
| ESCORENE FL00212 | ExxonMobil | Ethylene/Vinyl Acetate Copolymer | EVA4 | Density | 0.93 | g/cc |
| | | | | MFR (190° C./02.16 kg (E) | 2.5 | g/10 min |
| | | | | m.p. | 93 | ° C. |
| | | | | Comonomer Content | 12 | % |
| EB524AA | Westlake Chemical | Ethylene/Vinyl Acetate Copolymer - | EVA5 | Density | 0.934 | g/cc |
| | | | | MFR (190° C./02.16 kg (E) | 3.5 | g/10 min |
| | | | | m.p. | 90 | ° C. |
| | | | | Comonomer Content | 14.5 | % |
| | | | | Vicat s.p. | 67 | ° C. |
| EF528AA | Westlake Chemical | Ethylene/Vinyl Acetate Copolymer | EVA6 | Density | 0.940 | g/cc |
| | | | | MFR (190° C./02.16 kg (E) | 2.50 | g/10 min |
| | | | | m.p. | 85 | ° C. |
| | | | | Comonomer Content | 18.5 | % |
| ELVAX 3170 | DuPont | Ethylene/Vinyl Acetate Copolymer | EVA7 | Density | 0.94 | g/cc |
| | | | | MFR (190° C./02.16 kg (E) | 2.5 | g/10 min |
| | | | | Comonomer Content | 18 | % |
| | | | | m.p. | 90 | ° C. |
| ESCORENE FL00728 | ExxonMobil | Ethylene/vinyl acetate copolymer | EVA8 | Comonomer content | 28 | % |
| | | | | MFR (190° C./02.16 kg (E)) | 7 | g/10 min |
| ESCORENE ULTRA FL00119 | ExxonMobil | Ethylene/Vinyl Acetate Copolymer | EVA9 | Density | 0.942 | g/cc |
| | | | | MFR (190° C./02.16 kg (E)) | 0.65 | g/10 min |
| | | | | m.p. | 85 | ° C. |
| | | | | Comonomer Content | 19 | % |
| | | | | Vicat s.p. | 62 | ° C. |
| EASTAR PETG 6763 | Eastman Chemical | Copolyester | PETG | Density | 1.27 | g/cc |
| | | | | MFR (200° C./05.00 kg (G) | 2.8 | g/10 min |
| | | | | Viscosity Intrisic | 0.75 | dl/g |
| | | | | Tg | 80 | ° C. |
| | | | | Vicat s.p. | 85 | ° C. |

TABLE 1-continued

| Trade name | Supplier | Chemical Nature | Acronym | Analysis | Value | Units |
|---|---|---|---|---|---|---|
| Polybutene-1 PB 8640M | LyondellBasell Ind. | Polybutylene, Butene/Ethylene Copolymer | PB | Density | 0.906 | g/cc |
| | | | | MFR (190° C./02.16 kg (E)) | 1 | g/10 min |
| | | | | m.p. | 97 | ° C. |
| 10063 | Ampacet | Silica in Polyethylene, Low Density - Diatomaceous Earth | LDPE1 | Density | 1.05 | g/cc |
| POLYBATCH FSU 105E | Schulman | AntiBlock and Slip in Polyethylene, Low Density | LDPE2 | Density | 0.98 | g/cc |
| | | | | Additives | 10 | % |
| | | | | MFR | 20 | g/10 min |
| 10.075ACP SYLOID CONCENTRATE | Teknor Color | Silica in Polyethylene, Low Density | LDPE3 | Density | 0.97 | g/cc |
| | | | | Moisture Content | Max. 0.20 | % |
| | | | | MFR | 3.00 | g/10 min |
| | | | | Additives (AntiBlock) | Min. 10 Max. 15 | % |
| MB50-802 | Dow Corning | Polydimethylsiloxane in Polyethylene, Low Density | LDPE4 | Density | 1.03 | g/cc |
| | | | | MFR (190° C./02.16 kg) | 8.0 | g/10 min |
| LD158BW | ExxonMobil | Polyethylene, Low Density (LDPE) | LDPE5 | Density | 0.925 | g/cc |
| | | | | MFR (190° C./02.16 kg (E)) | 2 | g/10 min |
| | | | | m.p. | 111 | ° C. |
| LD259 | ExxonMobil | Polyethylene, Low Density (LDPE) | LDPE6 | Density | 0.915 | g/cc |
| | | | | MFR | 12 | g/10 min |
| | | | | m.p. | 105 | ° C. |
| OREVAC 18303 | Arkema | Maleic Anhydride-Modified Polyethylene, Linear Low Density | LLDPE-md1 | Density | 0.917 | g/cc |
| | | | | Vicat s.p. | 87 | ° C. |
| | | | | m.p. | 124 | ° C. |
| BYNEL 4125 | DuPont | Maleic Anhydride-Modified Polyethylene, Linear Low Density | LLDPE-md2 | Density | 0.930 | g/cc |
| | | | | MFR (190° C./02.16 kg) | 2.50 | g/10 min |
| | | | | m.p. | 126.0 | ° C. |
| | | | | Vicat s.p. | 109 | ° C. |
| OREVAC 18300 | Arkema | Maleic Anhydride-Modified Polyethylene, Linear Low Density | LLDPE-md3 | Density | 0.916 | g/cc |
| | | | | MFR (190° C./02.16 kg) | 2.3 | g/10 min |
| | | | | m.p. | 120 | ° C. |
| | | | | Vicat s.p. | 85 | ° C. |
| 10853 | Ampacet | Silica in LLDPE Diatomaceous Earth | LLDPE-md4 | Density | 1.05 | g/cc |
| | | | | MFR (190° C./02.16 kg) | 1.5 | g/10 min |
| | | | | Bulk (apparent) Density | 0.59 | g/cc |
| | | | | Moisture content | max 0.2 | % |
| | | | | Ash | 19.4 | % |
| BYNEL 21E810 | DuPont | Maleic Anhydride-Modif. Ethylene/Methyl Acrylate Copolymer | LLDPE-md5 | Density | 0.931 | g/cc |
| | | | | MFR (190° C./02.16 Kg (E)) | 2.2 | g/10 min |
| | | | | m.p. | 94 | ° C. |
| | | | | Maleic Anhydride Graft | min. 0.09 | % |
| Surpass HPs667-AB | NOVA Chemicals | Polyethylene High Density Homopolymer | HDPE1 | Density | 0.968 | g/cc |
| | | | | MFR (190° C./02.16 kg) | 6.0 | g/10 min |
| 102804 | Ampacet | AntiBlock and Slip in Polyethylene, High Density | HDPE2 | Density | 1.021 | g/cc |
| | | | | Ash | 9.8 | % |
| | | | | MFR (190° C./02.16 kg) | 7.1 | g/10 min |
| RIGIDEX HD6070FA | Ineos | Polyethylene, High Density (HDPE) | HDPE3 | Density | 0.96 | g/cc |
| | | | | MFR (190° C./02.16 kg (E)) | 7.6 | g/10 min |
| | | | | m.p. | 132 | ° C. |

TABLE 1-continued

| Trade name | Supplier | Chemical Nature | Acronym | Analysis | Value | Units |
|---|---|---|---|---|---|---|
| Griltex ES702 | EMS-Grivory | copolyester phthalic acid, adipic acid, ethylene glycol and butanediol | COPET1 | Density<br>m.p.<br>Viscosity Relative<br>Tg | 1.27<br>125<br>1.57<br><br>10 | g/cc<br>° C.<br>—<br><br>° C. |
| Griltex ES502GF | EMS-Grivory | Copolyester | COPET2 | Density<br>m.p.<br>Viscosity<br>Tg | 1.27<br>114<br>320<br>−11 | g/cc<br>° C.<br>mPa · s<br>° C. |
| Eastobond 19412 | Eastman Chemical | Copolyester - Terephthalate based | COPET3 | Density<br>Viscosity<br>Tg | 1.33<br>0.74<br>51 | g/cc<br>mPa · s<br>° C. |
| Griltex ES703 | EMS-Grivory | Copolyester phthalic acid, adipic acid, ethylene glycol and butanediol | COPET4 | Density<br>Tg<br>m.p.<br>Viscosity | 1.27<br>9<br>135<br>460 | g/cc<br>° C.<br>° C.<br>mPa · s |
| Griltex D2547E | EMS-Grivory | Copolyester | COPET5 | Density<br>Tg<br>m.p.<br>Viscosity | 1.27<br>10<br>130<br>1000 | g/cc<br>° C.<br>° C.<br>mPa · s |
| E171B | EVALCA/Kuraray | Hydrolyzed Ethylene/Vinyl Acetate Copolymer | EVOH1 | Density<br>MFR (190° C./02.16 kg)<br>m.p.<br>Tg<br>Comonomer content<br>Vicat s.p.<br>Crystallization point | 1.14<br>1.7<br>165<br>54<br>44<br>152<br>144 | g/cc<br>g/10 min<br>° C.<br>° C.<br>%<br>° C.<br>° C. |
| SOARNOL AT4403 | Nippon Gohsei | Hydrolyzed Ethylene/Vinyl Acetate Copolymer | EVOH2 | Density<br>Crystallization point<br>m.p.<br>MFR<br>Comonomer content | 1.140<br>144<br>164<br>3.5<br>44 | g/cc<br>° C.<br>° C.<br>g/10 min<br>% |
| SOARNOL ET3803 | Nippon Gohsei | Hydrolyzed Ethylene/Vinyl Acetate Copolymer | EVOH3 | Density<br>MFR (210 C., 2160 gr)<br>m.p.<br>Comonomer content<br>Tg<br>Crystallization point | 1.17<br>3.2<br>173<br>38<br>58<br>152 | g/cc<br>g/10 min<br>° C.<br>%<br>° C.<br>° C. |
| EVAL F101B | Evalca/Kuraray | Hydrolyzed Ethylene/Vinyl Acetate Copolymer | EVOH4 | Density<br>Vicat s.p.<br>m.p.<br>MFR<br>Comonomer content | 1.196<br>173<br>183<br>1.6<br>32 | g/cc<br>° C.<br>° C.<br>g/10 min<br>% |
| EVAL G156B | Evalca/Kuraray | Hydrolyzed Ethylene/Vinyl Acetate Copolymer - More than 40 mole % Ethylene | EVOH5 | Density<br>m.p.<br>MFR<br>Comonomer content<br>Tg | 1.12<br>160<br>6.4<br>48<br>50 | g/cc<br>° C.<br>g/10 min<br>%<br>° C. |
| SYLOBLOC 47 | GRACE Davison | amorphous silica | AB | Density<br>Particle size | 2.1<br>6.1 | g/cc<br>micron |
| Appeel ® 20D751 | DuPont | modified ethylene acrylate resin | EAC-mod | Density<br>MFR (190° C./02.16 kg (E)) | 0.940<br>2.5 | g/cc<br>g/10 min |
| Surlyn 1601 | DuPont | Sodium Neutralized Ethylene Methacrylic Acid Copolymer | EMAA-Na | Density<br>MFR (190° C./02.16 kg (E))<br>m.p. | 0.9400<br>1.30<br>96 | g/cc<br>g/10 min<br>° C. |
| PLEXAR pX1164 | Nippon Gohsei | Maleic Anhydride-Modified | EVA-md1 | Density<br>MFR (190° C./02.16 kg) | 0.928<br>3.8 | g/cc<br>g/10 min |

TABLE 1-continued

| Trade name | Supplier | Chemical Nature | Acronym | Parameters Analysis | Value | Units |
|---|---|---|---|---|---|---|
| | | Ethylene/Vinyl Acetate Copolymer | | Vicat s.p. | 58 | ° C. |
| | | | | Comonomer content | 15 | % |
| OREVAC 9318 | Arkema | Maleic Anhydride-Modified Ethylene/Vinyl Acetate Copolymer | EVA-md2 | Density | 0.945 | g/cc |
| | | | | MFR (190° C./02.16 kg (E)) | 7 | g/10 min |
| | | | | m.p. | 85 | ° C. |
| | | | | Comonomer content | 18 | % |
| STYRON 678E | DOW | Polystyrene | PS | Density | 1.05 | g/cc |
| | | | | MFR (200° C./05.00 kg (G)) | 10.5 | g/10 min |
| STYROL UX 684 D | BASF | Styrene/Butadiene/Styrene Triblock Copolymer | SBS | Density | 1.01 | g/cc |
| | | | | MFR (200° C./05.00 kg (G)) | 11 | g/10 min |
| | | | | Tg | 98 | ° C. |
| | | | | Vicat s.p. | 83 | ° C. |

Tg: Glass Transition Temperature; MFR: Melt Flow Rate; m.p.: melting point; Vicat s.p.: Vicat softening point.
EASTAR PETG 6763: Polyethylene Terephthalate/Glycol, copolyester of terephthalic acid, about 33 mole % 1,4-cyclohexane dimethanol and about 67 mole % ethylene glycol

TABLE 2

Comparative films Ex. C1-Ex. C3

| Layer | thickness μm | Ex. C1 | Ex. C2 | Ex. C3 |
|---|---|---|---|---|
| 1 | 2 | 58% blend of 25% MB1 and 75% EVA4 EVA8 40% LDPE1 2% | PETG 100% | EAC-md 100% |
| 2 | 6 | PB 20% EVA2 22% EMAA-Na 58% | PB 20% EVA2 22% EMAA-Na 58% | EVA7 100% |
| 3 | 23 | EVA1 100% | EVA1 100% | EVA1 100% |
| 4 | 3 | LLDPE-md1 100% | LLDPE-md1 100% | LLDPE-md1 100% |
| 5 | 12 | EVOH2 100% | EVOH2 100% | EVOH2 100% |
| 6 | 3 | LLDPE-md1 100% | LLDPE-md1 100% | LLDPE-md1 100% |
| 7 | 20.5 | EVA1 100% | EVA1 100% | EVA1 100% |
| 8 | 20.5 | EVA1 100% | EVA1 100% | EVA1 100% |
| 9 | 10 | HDPE3 100% | HDPE3 100% | HDPE3 100% |
| Total | 100 | | | |

Ex. C1, ExC2 and Ex. C3 stand for Comparative examples 1, 2 and 3. MB1 is 2% AB + 98% EVA4

TABLE 3

Comparative films Ex. C4-Ex. C9

| Layer | Thickness μm | Ex. C4 | Thickness μm | Ex. C5 | Thickness μm | Ex. C6 | Thickness μm | Ex. C7 (not cross-linked) | Thickness μm | Ex. C9 |
|---|---|---|---|---|---|---|---|---|---|---|
| 1 | 8 | LDPE3 3% EVA5 48% EVA6 48% PB 1% | 12 | LDPE2 5% LDPE5 5% EVA4 85% PB 5% | 6 | LDPE6 100% | 7 | COPET2 60% COPET3 40% | 12 | EVA4 85% LDPE5 5% PB 5% LDPE2 5% |
| 2 | 30 | EVA1 100% | 8 | EVA7 100% | 14 | LDPE5 100% | 17 | EVA9 100% | 8 | EVA7 100% |
| 3 | 8 | LLDPE-md2 100% | 40 | EVA9 100% | 19 | EVA1 100% | 17 | EVA9 100% | 40 | EVA9 100% |
| 4 | 13 | EVOH1 100% | 12 | LLDPE-md3 100% | 3 | LLDPE-md3 100% | 3 | LLDPE-md3 100% | 12 | LLDPE-MD3 100% |

TABLE 3-continued

Comparative films Ex. C4-Ex. C9

| Layer | Thickness μm | Ex. C4 | Thickness μm | Ex. C5 | Thickness μm | Ex. C6 | Thickness μm | Ex. C7 (not cross-linked) | Thickness μm | Ex. C9 |
|---|---|---|---|---|---|---|---|---|---|---|
| 5 | 8 | LLDPE-md2 100% | 13 | EVOH2 100% | 8 | EVOH4 100% | 12 | EVOH5 100% | 13 | EVOH2 100% |
| 6 | 29 | EVA1 100% | 12 | LLDPE-md3 100% | 3 | LLDPE-md3 100% | 3 | LLDPE-md3 100% | 12 | LLDPE-MD3 100% |
| 7 | 6 | HDPE1 93.5% LDPE4 1.5% HDPE2 5% | 22 | EVA9 100% | 11 | EVA1 100% | 22 | EVA9 100% | 22 | EVA9 100% |
| 8 |  | — | 21 | EVA9 100% | 26 | LDPE5 100% | 12 | EVA9 100% | 21 | EVA9 100% |
| 9 |  | — | 10 | HDPE3 100% | 10 | HDPE3 100% | 7 | HDPE3 100% | 10 | HDPE3 100% |
| Total | 102 |  | 150 |  | 100 |  | 100 |  | 150 |  |

Ex. C4, Ex. C5, Ex. C6, Ex. C7 and Ex. C9 stand for Comparative examples 4, 5, 6, 7 and 9. The film of Ex. C7 has the same composition and thickness of the film of Ex. 4 but it is not cross-linked.

TABLE 4a films of the invention Ex. 1-Ex. 5

| Layer | Thickness μm | Ex. 1 | Thickness μm | Ex. 2 | Thickness μm | Ex. 3 | Thickness μm | Ex. 4 | Thickness μm | Ex. 5 |
|---|---|---|---|---|---|---|---|---|---|---|
| 1 | 7 | COPET1 100% | 12 | COPET1 100% | 7 | COPET2 70% COPET3 30% | 7 | COPET2 60% COPET3 40% | 9 | COPET2 90% COPET3 10% |
| 2 | 17 | EVA1 100% | 8 | LLDPE-md5 100% | 17 | EVA9 100% | 17 | EVA9 100% | 23 | EVA9 100% |
| 3 | 17 | EVA1 100% | 63 | EVA9 100% | 17 | EVA9 100% | 17 | EVA9 100% | 22 | EVA9 100% |
| 4 | 3 | LLDPE-md1 100% | 13 | HDPE1 95% LLDPE-md4 5% | 3 | LLDPE-md3 100% | 3 | LLDPE-md3 100% | 3 | LLDPE-MD3 100% |
| 5 | 8 | EVOH2 100% |  |  | 12 | EVOH5 100% | 12 | EVOH5 100% | 12 | EVOH5 100% |
| 6 | 3 | LLDPE-md1 100% |  |  | 3 | LLDPE-md3 100% | 3 | LLDPE-md3 100% | 3 | LLDPE-MD3 100% |
| 7 | 30 | EVA1 100% |  |  | 22 | EVA9 100% | 22 | EVA9 100% | 29 | EVA9 100% |
| 8 | 8 | EVA1 100% |  |  | 12 | EVA9 100% | 12 | EVA9 100% | 15 | EVA9 100% |
| 9 | 7 | HDPE3 96% LDPE2 4% |  |  | 7 | HDPE3 100% | 7 | HDPE3 100% | 9 | HDPE3 100% |
| Total | 100 |  | 96 |  | 100 |  | 100 |  | 125 |  |

TABLE 4b films of the invention of Ex. 6 to Ex. 9

| Layer | Thickness μm | Ex. 6 | Thickness μm | Ex. 7 | Thickness μm | Ex. 8 | Thickness μm | Ex. 9 |
|---|---|---|---|---|---|---|---|---|
| 1 | 7 | COPET2 100% | 7 | COPET2 100% | 7 | COPET2 90% COPET3 10% | 7 | COPET2 80% COPET3 20% |
| 2 | 38 | EVA1 100% | 17 | EVA9 100% | 17 | EVA9 100% | 17 | EVA9 100% |

TABLE 4b-continued films of the invention of Ex. 6 to Ex. 9

| Layer | Thickness μm | Ex. 6 | Thickness μm | Ex. 7 | Thickness μm | Ex. 8 | Thickness μm | Ex. 9 |
|---|---|---|---|---|---|---|---|---|
| 3 | 11 | EMAA-Na 100% | 17 | EMAA-Na 100% | 17 | EMAA-Na 100% | 17 | EMAA-Na 100% |
| 4 | 3.5 | LLDPE-md3 100% | 3 | LLDPE-md3 100% | 3 | LLDPE-MD3 100% | 3 | LLDPE-MD3 100% |
| 5 | 11 | EVOH2 100% | 12 | EVOH2 100% | 12 | EVOH2 100% | 12 | EVOH2 100% |
| 6 | 3.5 | LLDPE-md3 100% | 3 | LLDPE-md3 100% | 3 | LLDPE-MD3 100% | 3 | LLDPE-MD3 100% |
| 7 | 16 | EMAA-Na 100% | 28 | EMAA-Na 100% | 28 | EMAA-Na 100% | 28 | EMAA-Na 100% |
| 8 | 18 | EVA1 100% | 6 | EMAA-Na 100% | 6 | EMAA-Na 100% | 6 | EMAA-Na 100% |
| 9 | 6 | HDPE3 100% | 7 | HDPE3 96% - LDPE2 4% | 7 | HDPE3 96% - LDPE2 4% | 7 | HDPE3 96% - LDPE2 4% |
| Total | 114 | | 100 | | 100 | | 100 | |

TABLE 4c films of the invention of Ex. 10 and Ex. 11

| Layer | Thickness μm | Ex. 10 | Thickness μm | Ex. 11 |
|---|---|---|---|---|
| 1 | 7 | COPET4 100% | 7 | COPET5 100% |
| 2 | 17 | EMAA-Na 100% | 17 | EMAA-Na 100% |
| 3 | 17 | EMAA-Na 100% | 17 | EMAA-Na 100% |
| 4 | 3 | LLDPE-MD3 100% | 3 | LLDPE-MD3 100% |
| 5 | 12 | EVOH2 100% | 12 | EVOH2 100% |
| 6 | 3 | LLDPE-MD3 100% | 3 | LLDPE-MD3 100% |
| 7 | 28 | EMAA-Na 100% | 28 | EMAA-Na 100% |
| 8 | 6 | EMAA-Na 100% | 6 | EMAA-Na 100% |
| 9 | 7 | HDPE3 96%-LDPE2 4% | 7 | HDPE3 96%-LDPE2 4% |
| Total | 100 | | 100 | |

The films of Tables 2 to 4 were submitted to specific tests to evaluate their main physical properties and performance as top webs when combined with supports of various chemical nature.

Mechanical and Optical Properties

Table 5 below reports the analytical evaluation of the film of Example 1 that showed very good mechanical and optical properties. Analytical methods used for the evaluation are also indicated. Evaluations were made on samples of films cross-linked at 220 KGys unless otherwise stated. Results are expressed as average values.

TABLE 5

| ASTM | Property | Units | Example 1 |
|---|---|---|---|
| D1003 | haze | % | 16 |
| D2457 | gloss | g.u. | 100 |
| D1003 | clarity | % | 92 |
| D882 | tensile at break at 23° C., LD | kg/cm² | 338 |
| D882 | tensile at break at 23° C., TD | kg/cm² | 276 |
| D882 | elongation at break at 23° C., LD | % | 650 |
| D882 | elongation at break at 23° C., TD | % | 680 |
| D882 | Elastic Modulus at 23° C., LD | kg/cm² | 2440 |
| D882 | Elastic Modulus at 23° C., TD | kg/cm² | 2450 |
| D1238 | MFI of the whole cross-linked film at 230° C., 2.16 kg | g/10 min | 0 |
| D1238 | MFI of the whole cross-linked film at 230° C., 21.6 kg | g/10 min | 0.43 |

TABLE 5-continued

| ASTM | Property | Units | Example 1 |
|---|---|---|---|
| D1238 | MFI of the whole uncross-linked film at 230° C., 2.16 kg | g/10 min | 5.8 |
| D2732 | Free shrink in LD/TD in oil at 160° C. | % | 9/−3 |
| Internal method | Free shrink in LD/TD in air at 160° C. in the oven | % | 6/−3 |
| Internal method | Free shrink in LD/TD in air at 180° C. in the oven | % | 7/−4 |
| Internal method | Free shrink in LD/TD in air at 200° C. in the oven | % | 8/−6 |

LD/TD: longitudinal/transverse direction

Free shrink in air was evaluated by following an internal method for each of the tested temperature:

1. three specimens 14 cm×14 cm were cut from the film of Example 1 and marked with a square of 10 cm×10 cm well centered within the specimen area, LD and TD directions of the specimen were also marked onto the specimens,
2. a small quantity of oxy-dry (corn starch, C300R by "Archem PRS Ltd") was spread onto each side of every specimen that was then inserted between two paper foils of the same dimensions (14 cm×14 cm),
3. the oven was heated at the temperature test (respectively 160° C., 180° C. and 200° C.) and let equilibrate for 10 minutes before moving to step 4, 4. the specimens were put in the oven at the testing temperature for 5 minutes,
5. the specimens were removed from the oven and let cool down to ambient temperature;
6. the dimensions of the (deformed) square were measured in the longitudinal and transverse direction and approximated to the nearest 1.0 mm,
7. for each of the LD and TD, the free shrink was calculated by the following formula:

free shrink (%)=[(100-dimension after shrink (mm))/ 100 mm]×100.

Gel Content Determination

The gel content express the percentage of a polymeric material insoluble in toluene and it is an index of the level of cross-linking of the polymer in that material.

In case the material is a multilayer film, the test may be carried out on the entire film—if all the polymers making the films, before cross-linking, are toluene-soluble—or on the part of it made of polymers which before cross-linking are toluene-soluble—by delaminating the desired layers and not submitting to the test those layers whose polymers are per se not soluble in toluene, such as for instance EVOH or ionomers. If the gel content is evaluated on the toluene-soluble part of the film only, as explained above, the result represents a good index of irradiation for the whole film, including for the layers not subjected to the analysis. In fact, as the present films are generally prepared by coextrusion of all layers followed by irradiation, it follows that all the layers have been accordingly subjected to the same irradiation.

The result is expressed as percentage by weight of the undissolved material (i.e. the cross-linked material) after toluene treatment with respect to the total weight of the initial material. The test was performed according to the following procedure.

A square of wire metal gauze (80 mesh, 15 cm×15 cm) was cut and cleaned by submersion in a beaker containing toluene. After solvent evaporation, the wire gauze was given a funnel shape and weighted (weight B). 120 ml of toluene were put in a 200 ml beaker and heated on a hot plate.

A sample of the material of about 150 mg was weighted (weight A) and put it in the boiling toluene for 30 minutes, under stirring. The solution was then filtered on the wire gauze and the gel remained on the wire gauze. The wire gauze with the gel was dried under hood, weighted (weight C) after 24 h and 48 h up to a constant weight.

The gel content percentage was calculated, for each weighing with the following formula: (C−B)/A×100 and the average value was calculated. The analysis was repeated twice for each material.

Example 12

The films of the invention and the comparative films were used in the manufacture of VSP packages as detailed herein below. The packages were subjected to the measure of the opening force or just manually opened.

Example 12a: Opening Force Evaluation of Packages Made on "Rollstock" Machine

The opening force evaluation was carried out on packages manufactured on a Rollstock machine (R272CD by Multivac), wherein the top web was the film of Example 1 according to the invention and the bottom web (supplied to the machine in the form of a roll, to be thermoformed on the machine before the sealing cycle) had the following composition and code: PentaFood KSeal APET 250 microns (bottom 1a), APET 200 microns/PE 50 microns (polyethylene sealant liner). The bottom web was used with the APET layer in contact with the sealant layer of the top web. The APET was an amorphous PET having a Tg of about 78° C.

The thermoformed bottom was rectangular (250 mm long×135 mm wide, 5 mm of depth).

Machine speed was 6.4 cycles/minute and the vacuum applied was set lower than 15 mbar, the vacuum time was 1 sec. The product packed therein was about 60 g of ham placed off centered onto one-half of the bottom, the other half being used to cut the specimens for the opening force measurement.

Various temperatures of the dome and two dome heights (30 and 60 mm) were set up for the packaging cycles, as per Table 6a.

Other packages were manufactured on a Rollstock machine (R570CD by Multivac, with a 50 mm high dome), wherein the top web were the films of Ex. 6, Ex. 7, Ex. 8 or Ex. 9 according to the invention and the bottom web (supplied to the machine in the form of a roll, to be thermoformed on the machine before the sealing cycle) had the following composition and code: APET EGA010 250 microns (bottom 1b), APET 200 microns/PE 50 microns (polyethylene sealant liner). The bottom web was used with the APET layer facing the sealant layer of the top web. The APET was an amorphous PET having a Tg of about 78° C.

The thermoformed bottom was rectangular (250 mm long×140 mm wide, 5 mm of depth).

Machine settings and packaged products were the same reported above.

Various temperatures of the dome were set up for the packaging cycles, as reported in Table 6b.

Other packages were manufactured on a Rollstock machine (R570CD by Multivac, with a 50 mm high dome), wherein the top web were the films of Ex.2, Ex.4 or Ex.5 according to the invention and the bottom web (supplied to the machine in the form of a roll, to be thermoformed on the machine before the sealing cycle) had the following composition and code: EGA012 APET-PET 250 microns (bottom 1c), APET 200 microns/PE 50 microns (polyethylene sealant liner). The bottom web was used with the APET layer facing the sealant layer of the top web. The APET was an amorphous PET having a Tg of about 78° C.

The thermoformed bottom was rectangular (250 mm long×140 mm wide, 5 mm of depth).

Various temperatures of the dome were set up for the packaging cycles, as reported in Table 6c.

Other packages were manufactured on a Rollstock machine (R570CD by Multivac, with a 50 mm high dome), wherein the top web were the films of Ex.1, Ex.5 and Ex.6 according to the invention and the bottom web (supplied to the machine in the form of a roll, to be thermoformed on the machine before the sealing cycle) had the following composition and code: EGA012 APET-PET 250 microns (bottom 1c) as depicted above.

The thermoformed bottom was rectangular (250 mm long×140 mm wide, 5 mm of depth).

The temperature of the dome set up for the packaging cycles is reported in Table 6d.

The opening force was measured on specimens obtained from the bottom flat part of the packages and having specimen dimensions 2.54 cm (1 inch) of width and about 15-20 cm of length cut along the machine direction (namely along the direction of unwinding of the roll). 6 specimens for each packaging conditions were tested and the average value of the opening force was calculated (see Tables 6a, 6b. 6c and 6d which report these values). The opening of each specimen was started manually in order to have sufficient dimensions to put the detached top web on the upper jag (the one moving upwards during the test) of the dynamometer and the bottom web on the lower jag (the fixed one).

Dynamometer (Instron) conditions were:
starting jags distance: 2 cm,
speed: 300 mm/min,
opening length: 5 cm.

The instrument measures the force needed to separate the top from the bottom web, in particular measured the average force along the 5 cm of opening for each sample (gf/2.54 cm). Finally, the average of values for the 6 samples tested was calculated and reported in the relevant tables 6a, 6b, 6c and 6d.

TABLE 6a

| Bottom web: bottom 1a | | |
|---|---|---|
| Film Ex. 1 | Opening force gf/2.54 cm (1 inch) | |
| Dome T (° C.) | dome 30 mm | dome 60 mm |
| 140 | 459 | 500 |
| 150 | 460 | 479 |
| 160 | 473 | 497 |
| 170 | 478 | 446 |
| 180 | 457 | 421 |
| 190 | 444 | 421 |
| 200 | 429 | 442 |
| 210 | 426 | 424 |

As can be seen from Table 6a, the values of the opening forces are perfectly in line with the target values for an easy opening package, even at very low dome temperature (140° C.).

TABLE 6b

| Bottom web: bottom 1b | | |
|---|---|---|
| Top web | Dome T (° C.) | Opening force (gf/2.54 cm) |
| Ex. 6 | 140 | 221 |
|  | 150 | 246 |
|  | 160 | 302 |
|  | 170 | 373 |
| Ex. 7 | 160 | 293 |
|  | 170 | 546 |
|  | 180 | 467 |
|  | 190 | 458 |
| Ex. 8 | 160 | 166 |
|  | 170 | 196 |
|  | 180 | 248 |
|  | 190 | 302 |
| Ex. 9 | 160 | 268 |
|  | 170 | 249 |
|  | 180 | 327 |
|  | 190 | 419 |

As can be seen from the force values of tables 6a and 6b, the seal strength of the film Ex. 6, 8 and 9 increases as the sealing temperature increases, thus allowing to tailor the opening force of the package by suitably selecting the seal temperature. On the contrary, the sealability of the film of Ex.1 and Ex. 7 seems not to be affected by the sealing temperature as the peel force remains in the range of 400-500 gf/2.54 cm with sealing temperatures from 140 to 210° C. for the film of Ex. 1 and from 170 to 190° C. for the film of Ex. 7. Providing a constant opening force, independently of the precise sealing temperature, may be advantageous as it does not require a strict control of temperature settings and provides satisfactory results even in case of variance of process conditions.

TABLE 6c

| Bottom web: bottom 1c | | |
|---|---|---|
| Top web | Dome T (° C.) | Opening force (gf/2.54 cm) |
| Ex. 4 | 160 | 131 |
|  | 175 | 144 |
|  | 190 | 167 |
| Ex. 5 | 175 | 193 |
|  | 190 | 181 |

As can be seen from the data of Table 6c, the films of the invention seal well on PE lined supports and provide for easily openable packages.

TABLE 6d

| Bottom web: bottom 1c | | |
|---|---|---|
| Top web | Dome T (° C.) | Opening force (gf/2.54 cm) |
| Ex. 1 | 190 | 605 |
| Ex. 5 | 190 | 134 |
| Ex. 6 | 190 | 562 |

As can be seen from the data of Table 6d, the films of the invention seal well on PE lined supports and provide for easily openable packages. Comparative films according to examples Ex. C1, Ex. C2 and Ex. C3 were also used to manufacture VSP packages by using machine R570CD by Multivac with a dome height of 60 mm heated at 210° C., the vacuum time was 1 s. The bottom webs used were:

PentaFood KSeal APET 250 microns, APET 200 microns/ PE 50 microns, as above reported (bottom 1a), bottom 2, whose structure is reported in Table 7a below.

The bottom web were supplied to the machine in the form of a roll and were thermoformed on the machine before the sealing cycle. The thermoformed bottom was rectangular (250 mm long×135 mm wide, 5 mm of depth).

Both the bottom web rolls were reversed to get their external layer (APET for bottom 1a and PETG for bottom 2) in contact with the sealant layer of the top web.

Machine speed was 6.4 cycles/minute and the vacuum applied was set lower than 15 mbar. The product packed therein was about 60 g of ham placed off centered onto one half of the bottom, the other half being used to cut the specimens for the opening force measurement according to the method described hereinabove.

TABLE 7a

| Layer | | Bottom 2 |
|---|---|---|
| 1 | 2.0 μm | EVA4 100% |
| 2 | 6.0 μm | PB 20% |
|  |  | EVA2 22% |
|  |  | EVA3 58% |
| 3 | 8.0 μm | EVA-md1 100% |
| 4 | 108.5 μm | PS 45% |
|  |  | SBS 55% |
| 5 | 8.0 μm | EVA-md1 100% |
| 6 | 6.0 μm | EVOH3 100% |
| 7 | 8.0 μm | EVA-md1 100% |

TABLE 7a-continued

| Layer | | Bottom 2 |
|---|---|---|
| 8 | 108.5 μm | PS 45% |
| | | SBS 55% |
| 9 | 10.0 μm | EVA-md2 100% |
| 10 | 15.0 μm | PETG 100% |
| Total | 280.0 μm | |

The film of Comparative example 1 showed, with both the bottom webs, inconsistent, scarce and not homogenous sealing at manual opening.

The film of Comparative example 2, having a sealing layer a) made of a (co)polyester with a Tg of 80° C. showed, with both the bottom webs, a completely inconsistent sealing and low/no bond between the sealant layer of the top and of the bottom webs, even at a dome temperature as high as 210° C. This outcome was unexpected as the PETG sealant of the film of Comparative 2 is the same resin as the PETG layer of bottom 2 onto which this top films was sealed.

The film of Comparative example 3 showed good sealing with bottom 1a, as the average opening force (measured as described above) was 550 g/inch. However, this film did not perform well for drip loss retention as reported in Table 9a.

Moreover, the film of comparative example 3, showed strong sealing with bottom 2, as the average easy opening force (measured as described above) was 1000 g/inch, which is considered too high for vacuum skin packages; in addition such film did not allow obtaining a good drip loss retention as reported in Table 9a.

The film of Example 1 demonstrated its capacity to seal and provide easy opening sealing onto APET and PETG supports, even without the need of specific polyester sealant coating or layer onto such support. Similarly, all the films of the invention exemplified above show a proper balance of seal strength and openability, on different substrates.

Example 12b: Evaluation of the Opening Force of VSP Packages with Aluminum Trays VSP packages were manufactured according to the conditions depicted above (RC570CD Rollstock machine Dome height 50 mm, Dome temperature as reported in Table 7b) with the films of Ex. 1, Ex. 5, Ex. 6, Comparative film C8 and with a commercial aluminum tray (Cuki tray, oval shape, max dimensions 445 mm×295 mm×28 mm of depth, thickness at the flange 132-140 microns, weight 41.7 g). The bottom of the tray (dimensions: 310 mm×210 mm) was cut and placed onto a thermoformed polyester tray, the ham was laid onto the aluminum surface and the film sealed onto the whole internal surface not covered by the ham, namely onto both the aluminum bottom and the seal surface of the thermoformed tray. The samples for measuring the opening force were cut from the portions of the package in which the film was directly sealed onto the aluminum surface.

TABLE 7b

| Cuki aluminum trays | | |
|---|---|---|
| Top web | Dome T (° C.) | Opening force (gf/2.54 cm) |
| Ex. 1 | 190 | 605 |
| Ex. 5 | 190 | 134 |

TABLE 7b-continued

| Cuki aluminum trays | | |
|---|---|---|
| Top web | Dome T (° C.) | Opening force (gf/2.54 cm) |
| Ex. 6 | 190 | 562 |
| Ex. C8 | 210 | <30 |

As can be seen from the data reported in Table 7b, the films of the invention of Ex. 1, Ex. 5 and Ex. 6 seal well on the aluminum surface too while the comparative commercial film C8 does not.

Example 12c: Opening Force Evaluation of Packages Made on "Tray Skin" Machine

The opening force evaluation was also carried out on VSP packages obtained on a Tray Skin machine, called Multivac T200, wherein the top web was the film of example 1 and the bottom webs were bottom 1a and bottom 2.

Various temperatures of the dome and a dome height of 10 mm were set up for the packaging cycles, as per Table 8a. The vacuum was set lower than 15 mbar and the vacuum time was 1,5 sec, corresponding to the heating time of the top web.

Product packed was about 60 g of ham placed off centered onto one half of the bottom, the other half being used to cut the specimens for the opening force measurement, as described above.

The opening force was measured, as hereinabove described, on specimens obtained from the bottom flat part of the packages and having specimen dimensions 2.54 cm (1 inch) of width and about 15-20 cm of length cut along the machine direction. Six specimens for each packaging conditions were tested and the average value of the opening force was calculated (see Table 8a, which reports force values).

The bottom webs were thermoformed off-line from the rolls of bottom 1a and bottom 2 in order to get their external layer (APET for bottom 1a and PETG for bottom 2) in contact with the sealant layer of the top web in the package. Tray dimensions were 15 cm wide, 20 cm long, 30 mm deep.

TABLE 8a

| Film Ex. 1 | Dome T (° C.) | opening force, gf/2.54 cm |
|---|---|---|
| bottom 1a | 150 | 365 |
| | 180 | 361 |
| | 200 | 358 |
| bottom 2 | 150 | 356 |

As can be seen from Table 8a, the average values of the opening forces are perfectly in line with the target values for easy opening in vacuum skin packaging application, even at very low dome temperature (150° C.).

The film according to the present invention demonstrated to be versatile and suitable for use on various vacuum skin packaging equipment and with different bottom webs or trays.

Example 12d: Manufacturing and Manual Opening of VSP Packages with Compostable Trays VSP packages were manufactured with the manual Darfresh packaging machine (tray skin machine) Cryovac VS26 (settings: vacuum time 7.5 sec., flat dome, dome temperature: 190° C.), using the following compostable trays:

a) Cuki (Professional Compostable EV-103Bio, rectangular trays; size: (mm) 159×109×26; total thickness (at the flange): 520 μm; Composition: PLA bulk+PETG sealant.
b) Econeer (03D-531-3311) rectangular trays (made in China); size: (mm) 220×150×30; total thickness: 730 μm; Composition: sealant layer: CoPET (14 microns); second bulk layer: paper with polyurethanes, red pigment and additives (sulphates as fillers).

In each tray, a humid pad was placed to mimic the product.

Two packages for each tray were manufactured, using as top web the film of Ex. 4.

The packages were manually opened by three panelists, who assigned the following scores on the seal and peel performance:

TABLE 8b

| Top web: film of Ex. 4 | |
|---|---|
| Compostable tray | Sealability and Peelability |
| a) Cuki | 3, 3, 3 |
| b) Econeer | 3, 3, 3 |

Scores: 3 good; 2 sufficient; 1 poor

Example 13: Evaluation of Drip Retention

An internal test method was used for testing the ability of the films to prevent or minimize drip formation in VSP packages (drip retention capacity).

Three kind of packaging machines were used: a Rollstock machine (R272CD or R570CD by Multivac), a Tray Skin machine (T200 by Multivac) and, for a variant of the VSP process with perforated tray, a Darfresh® on Tray machine (TRAVE E340 by Mondini), with the food products and conditions specified herein below.

The VSP packages were then vertically stored in a box at 2° C. in a dark cell. The vertical storage represents the most demanding positioning for drip evaluation and allows to highlight the different performance of the packaging films.

The drip retention capacity was evaluated after 1, 2 and possibly 3 weeks by two or three panelists who agreed on the final judgment on each package.

The following score range was applied from 1 to 5:
1 means no drip around the product,
2 means some drip, with a maximum distance of the contour of the drip area from the product up to 1 mm,
3 means some drip, with a maximum distance of the contour of the drip area from the product between 1 and 3 mm,
4 means more drip, with a maximum distance of the contour of the drip area from the product between 3 and 5 mm,
5 means evident drip, with a maximum distance of the contour of the drip area from the product higher than 5 mm.

A drip retention score not higher than 3 is considered acceptable from a consumer perspective.

Example 13a: Drip Retention of VSP Packages Manufactured on Rollstock Machine R272CD (Equipped with Dome of 60 mm of Height)

Packaging machine setting was the same used for the opening force evaluation with the exception of the temperature of the dome that is reported in Table 9a.

Packaged product was beef meat (150-200 g/pack) placed on the bottom always using the same product off centered positioning.

The sealant layer of the bottom was APET for bottom 1a and PETG for bottom 2.

The thermoformed bottom was rectangular (250 mm long×135 mm wide, 5 mm of depth). Three packs were judged for each condition.

The top webs and bottom webs used in combination and the drip loss scores are reported in Table 9a.

TABLE 9a

| bottom web | top web | Dome T (° C.) | Drip score (3 packs) after 1 week | after 2 weeks |
|---|---|---|---|---|
| bottom 2 | Ex. C1 | 210 | 4, 4, 4 | |
| | Ex. C2 | 210 | 5, 5, 5 | |
| | Ex. C3 | 210 | 4, 4, 4 | |
| bottom 1a | Ex. C1 | 210 | 4, 4, 4 | |
| | Ex. C2 | 210 | 5, 5, 5 | |
| | Ex. C3 | 210 | 4, 4, 4 | |
| | Ex. C5 | 210 | 5, 5, 5 | 5, 5, 5 |
| | Ex. C4 | 210 | 4, 5, 5 | 4, 5, 5 |
| | Ex. 1 | 210 | 1, 2, 2 | 2, 2, 3 |
| | Ex. 1 | 170 | 2, 3, 3 | 2, 3, 3 |
| | Commercial top C8 | 210 | 3, 4, 4 | 4, 4, 4 |

The comparative (C8) commercial top is a cross-linked 7 layers, 125 microns top web with EVA as sealant and EVOH as barrier, proposed in the market also for polyester-based supports.

As can be seen from Table 9a, the film of Ex. 1 according to the present invention demonstrated a more efficient drip retention, also in vertical position and even up to 2 weeks from packaging, in addition to excellent opening force values. Moreover, even when sealed at lower temperature (170° C. vs. 210° C.) the film of Example 1 resulted the most efficient in terms of drip retention compared to the commercial top C8 and to the Comparative examples. The drip retention capacity was not significantly decreased when sealing was carried out at 170° C. instead of 210° C.

Drip Retention of VSP Packages Manufactured on Rollstock Machine R570CD (Equipped with Dome of 50 mm of Height)

Machine settings were the same as previously described, while the dome temperature is reported in the Table 9b below.

The product packaged in this trial was beef meat (150-200 g/pack) placed on the bottom always using the same product off centered positioning. Three packs were prepared and judged for each condition.

The thermoformed bottom (bottom 1b as previously described) was rectangular (250 mm long×140 mm wide, 5 mm of depth).

The top webs used in combination with bottom 1b and the drip loss scores of the VSP packages are reported in Table 9b.

TABLE 9b

| | | Drip score (3 packs) | | |
|---|---|---|---|---|
| top web | Dome T (° C.) | after 1 week | after 2 weeks | after 3 weeks |
| Ex. 10 | 210 | 1, 1, 1 | 1, 1, 1 | 1, 1, 1 |
| Ex. 11 | 210 | 1, 1, 1 | 1, 1, 1 | 1, 1, 1 |

In another test, carried on with the same machine and conditions just described above, the drip performance of VSP packages, made of the film of Ex. 6 and of bottom 1b, was evaluated but at a lower sealing temperature and using different products, as shown in the following Table 9c:

TABLE 9c

| | | | Drip score (3 packs) | | |
|---|---|---|---|---|---|
| top web | Dome T (° C.) | Product | after 1 week | after 2 weeks | after 3 weeks |
| Ex. 6 | 150 | Beef | 1, 1 | 1, 2 | 2, 2 |
| | | Chicken breast | 1, 2 | 3, 3 | — |
| | | Smoked salmon | 1, 1 | 1, 1 | 1, 1 |

As resulted from the data of table 9c, chicken breast is the most critical product. Even with this product, the film of Ex. 6 according to the invention provides for an acceptable drip formation up to 2 weeks of storage, while for the other products drip is contained even after 3 weeks.

Example 13b: Drip Retention of VSP Packages Manufactured on Tray Skin Machine (Equipped with Dome of 10 mm)

Packaging machine setting was the same used for the opening force evaluation with the exception of the temperature of the dome, which is reported in Table 10. Product used were beef meat (150-200 g meat/pack) and smoked salmon (100 g/pack), placed in the tray using always the same off centered product positioning.

4 beef meat packs (150-200 g meat/pack) for each condition and 2 smoked salmon packs for each condition were evaluated for drip retention after 1 week from the packaging. Table 10 reports the single score assigned by the panelists to each pack. For the commercial top, the evaluation was performed on beef only and with 2 packs instead of 4.

The trays used were made of bottom 1a with the following dimensions: 15 cm wide, 20 cm long, 30 mm deep.

The bottom web was thermoformed in order to get its external layer (APET) in contact with the sealant layer of the top web.

TABLE 10a

| Top web | Dome T (° C.) | Beef | Salmon |
|---|---|---|---|
| Ex. C4 | 150 | 4, 4, 4, 5 | 3, 3 |
| Ex. C4 | 180 | 2, 2, 2, 4 | 2, 3 |
| Ex. 1 | 150 | 1, 1, 1, 2 | 2, 2 |
| Ex. 1 | 180 | 1, 1, 1, 2 | 1, 1 |
| Commercial top C8 | 150 | 3, 4 | not available |

As can be seen from Table 10a, the film of Ex. 1 according to the present invention demonstrated a more efficient drip retention, also in vertical position and even up to 2 weeks from packaging (data not shown), even with critical products for drip loss, such as fresh red meat and salmon. As seen for the previous drip evaluation, a lower sealing temperature did not affect the drip retention capacity of the film of Example 1.

Quite advantageously the lower sealing temperature of the films of the invention prevents tray deformation that may occur when APET-tray are used with certain tray skin machines which seal onto the flange, namely when the tray flange remains in contact with the sealing bar for the whole cycle and may thus be distorted.

Example 13c: Drip Retention of VSP Packages Manufactured on Darfresh on Tray Machine (Mondini TRAVE E340 Equipped with Dome of 25 mm of Height)

Packaging machine settings were vacuum time 1 sec., machine speed 5 cycles/min., film release time: 2 sec., dome temperatures: 150 and 160° C.

Packaged product was beef meat or fresh chicken breast (150-200 g/package), each product being placed in the tray always at the same off centered positioning.

The bottoms were rectangular (180 mm×260 mm×5 mm of depth) A-PET (Bottom 3) and C-PET (Bottom 4) trays from Faerch, 700 microns of thickness.

Two or three packages were judged for each condition.

The top webs and bottom webs used in combination and the drip loss scores are reported in the following Table 10b:

TABLE 10b

| | | | Product | Drip score (3 packs) | | |
|---|---|---|---|---|---|---|
| Top web | Bottom tray | Dome T (° C.) | Beef or Ckn | after 1 week | after 2 weeks | after 3 weeks |
| Ex. 7 | 3 | 160 | Beef | 1, 1, 1 | 1, 1, 1 | 1, 1, 1 |
| | | | Ckn | 1, 1, 1 | 1, 1, 2 | 1, 1, 2 |
| Ex. 8 | 3 | 160 | Beef | 1, 1, 1 | 1, 1, 1 | 1, 1, 1 |
| | | | Ckn | 1, 1, 1 | 1, 1, 2 | 1, 1, 2 |
| | 4 | | Beef | 1, 1 | 1, 1 | 1, 1 |
| | | | Ckn | 1, 1 | 1, 1 | 1, 1 |
| Ex. 9 | 3 | 150 | Beef | 1, 1, 1 | 1, 1, 1 | 1, 1, 1 |
| | | | Ckn | 1, 1, 1 | 1, 1, 2 | 1, 1, 2 |
| | | 160 | Beef | 1, 1, 2 | 1, 2, 2 | 1, 2, 2 |
| | | | Ckn | 1, 2, 2 | 1, 2, 2 | 1, 2, 2 |
| | 4 | 150 | Beef | 1, 1, 1 | 1, 1, 1 | 1, 1, 1 |
| | | | Ckn | 1, 1, 2 | 1, 1, 2 | 1, 1, 2 |
| | | 160 | Beef | 1, 1, 1 | 1, 1, 1 | 1, 1, 1 |
| | | | Ckn | 1, 1, 1 | 1, 1, 1 | 1, 1, 1 |

Ckn: chicken breast

Example 13d: Drip Retention of VSP Packages with Cross-Linked Vs not Cross-Linked Top Webs (Manufactured on Darfresh Packaging Machine (Tray Skin Machine) Cryovac VS26)

VSP packages were manufactured with the following machine settings: 7.5 sec. vacuum time, flat dome, dome temperature: as reported in Table 10c.

The packaged product was fresh red meat, the bottom was bottom 1 as previously described.

TABLE 10c

| Bottom: web: bottom 1 (with polyester surface towards the product) | | | | |
|---|---|---|---|---|
| Top web | Dome T (° C.) | Pack appearance | Drip score (1 week) | Drip score (2 weeks) |
| Ex. 4 | 100 | No skin effect | 5, 5 | 5, 5 |
| | 120 | Skin effect borderline | 3, 3 | 3, 4 |
| | 130 | Skin effect good, soft and smooth opening | 2, 2 | 2, 2 |
| | 160 | Skin effect good smooth and pleasant at opening | 1, 1 | 1, 2 |
| C7 | 100 | No skin effect | 5, 5 | 5, 5 |
| | 120 | Skin effect borderline, whitening of the structure | 3, 3 | 3, 4 |

TABLE 10c-continued

Bottom: web: bottom 1 (with polyester surface towards the product)

| Top web | Dome T (° C.) | Pack appearance | Drip score (1 week) | Drip score (2 weeks) |
|---|---|---|---|---|
| | 130 | Skin effect but pleats and whitening of the structure, scattered at opening | 2, 2 | 2, 2 |
| | 160 | Skin effect but pleats and bubbles, whitening of the structure, hard and scattered at opening | 1, 1 | 1, 1 |

As can be seen from the drip data reported in the Tables 9a to 10c, the films of the invention perform much better than both the comparative films C1-C6 and C8—which are cross-linked but do not include a polyester based sealant layer as herein defined—and the comparative film C7—which includes a polyester based sealant layer as herein defined but it is not cross-linked.

In particular, considering the film of Ex. 4 vs the comparative not cross-linked film C7 it was observed that for both the skin draping starts to be acceptable from 130° C., but while the cross-linked version (Ex. 4) remains transparent, the comparative film whitens (transparency is totally lost) and the structure seems burnt.

Furthermore, the film of the invention of Ex. 4, notwithstanding the cross-linking, seal unexpectedly well and avoid drip loss while showing a smooth and pleasant opening effect within the operative temperature window with a very good skin effect. The not x-linked comparative structure C7 does not have any good operative window and shows scattered opening effect (higher and variable opening force).

Example 13e: Drip Retention and Openability of VSP Packages with Steel Support

VSP packages were manufactured on a darfresh packaging machine (tray skin machine) Cryovac VS26 with the following machine settings: 7.5 sec. vacuum time, flat dome, dome temperature as reported in Table 10d below.

The packaged product was pork meat, placed onto rectangular flat steel supports (50 cm×70 cm×0.5 cm). The top webs were the film of Ex. 4 and the comparative film C9.

TABLE 10d

| Top web | Dome T (° C.) | Drip score (1 week) |
|---|---|---|
| Ex. 4 | 185 | 1, 1 |
| C9 | 200 | 2, 3 |

After 1 week in fridge, the comparative packages had more drip formation than the package of the invention. At opening, the package of the invention appeared better sealed than the comparative.

Example 14: Formability and Implosion Resistance

A conventional vacuum skin cycle was performed using Rollstock R570CD machine, with dome heights of 50 mm, dome temperature of 210° C., at a machine speed of 6.0 cycles/min, vacuum time 1 s. The bottom forming depth was 5 mm and the bottom dimensions were 250 mm×135 mm. The bottom material was bottom 2. For testing implosion resistance and formability, the sealant layer of bottom 2 (100% EVA4) was used as food contact layer and as layer sealing to the upper top web.

The packaged products were parallelepiped and circular plastics blocks as further described herein.

Formability Test

Figure 2:
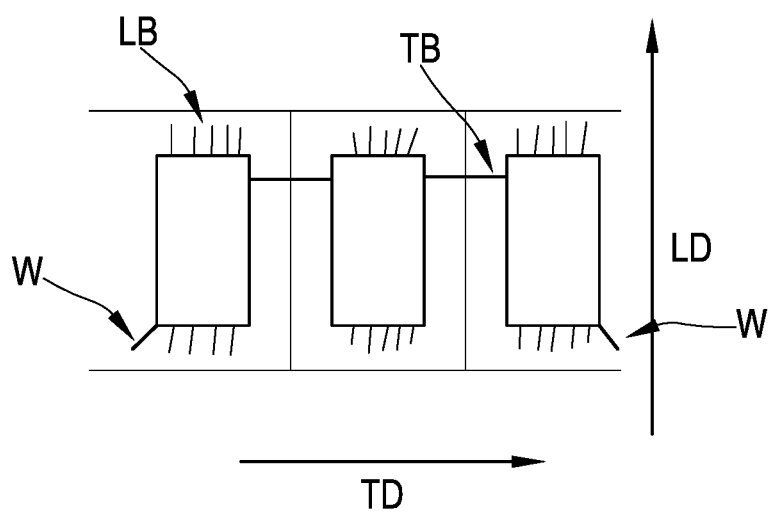
Figure 3:
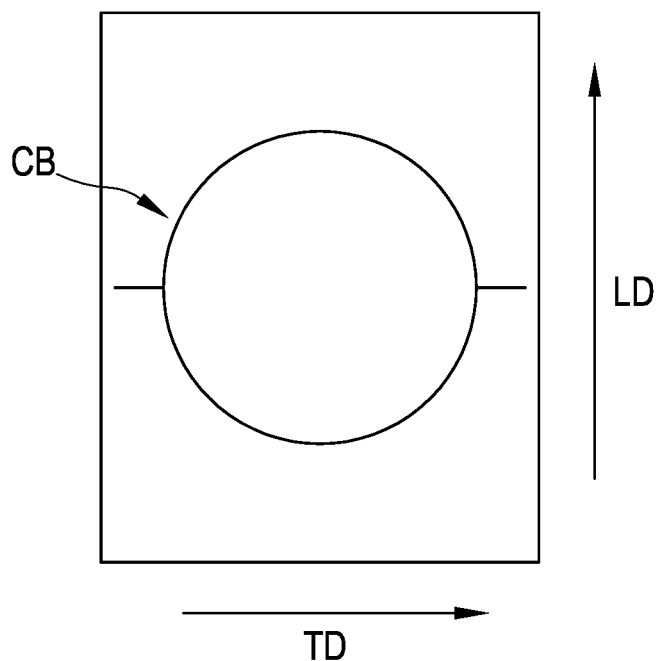

The formability evaluation measures the incidence of sealing defects, i.e bridging and webbing pleats (illustrated in FIG. 1 to 3).

The packaged products were parallelepiped (105 mm wide×190 mm long×30 mm high) and circular (diameter 105 mm, height 28 mm) plastic blocks. The machine processed 3 packs per cycle, 5 cycles were repeated, therefore a total of 15 packs were scored for formability by using this internal test method.

After the packaging, the packs were scored by two panelists for webbing (pleats located in the corner) and for bridging, being 3 the best score (no webbing, no bridging) and 0 the worst score.

The average result of this evaluation for the film of Example 1 and Comparative 6 are reported in Table 11a, for the films of Ex. 2 to 4 in Table 11b and for the films of Ex. 4 and Ex. 5 in Table 11c.

Implosion Test

Figure 4:
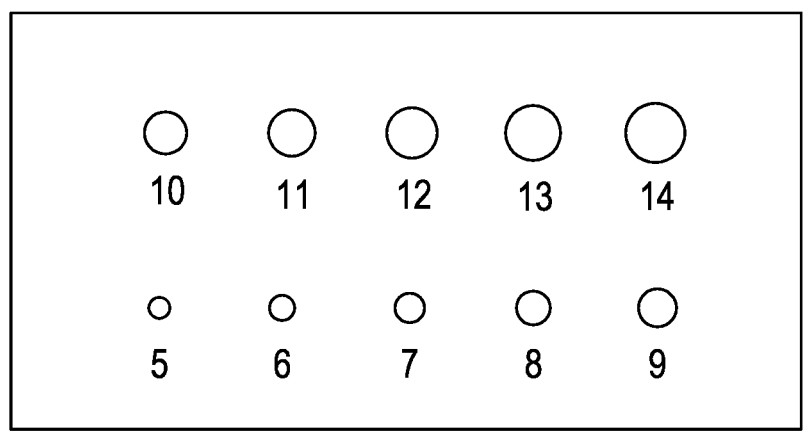
FIG. 4 is a top view of the block used in the present implosion resistance test. The drawing is on scale, namely the proportion of the parts are kept, and the measures of the holes reported therein are the real dimensions in mm.

This property is used to measure the ability of a VSP film to fill the cavities without breaking. A conventional VSP cycle was performed, as described above for the formability test, but the packaged products were parallelepiped plastic blocks (100 mm wide×190 mm long×25 mm high) having, on the top surface, 10 calibrated holes of different diameters in the range from 5 to 14 mm and same depth (20 mm) (see FIG. 4). Moreover, for the implosion test, a reduction of the reventing nozzle diameter was applied through a screwed insert: the final diameter of the nozzle was 7 mm instead of 25 mm in order to allow for a slower draping of the film onto the support and the testing block.

The test was repeated 30 times for each film and the average score calculated. During the packaging tests with the plastic block, the film tends to undergo a stretching stress, which increases with the area of the hole. The area of the largest hole before the film breaks was taken as index of implosion resistance of the film, as highly representative of the film skin packaging capability.

The experimental data are collected in the Tables 11a to 11c.

TABLE 11a

| Top film | Implosion resistance (mm) | Formability | | |
|---|---|---|---|---|
| | | Webbing | LD Bridging | TD Bridging | Circular Bridging |
| Ex. 1 | 13.0 | 2.9 | 3 | 3 | 3 |
| Ex. C6 | 10.4 | 2.9 | 3 | 3 | 2.8 |

As can be seen from Table 11a, the film of Example 1 was excellent in terms of formability values and, unexpectedly, it performed better than the Comparative film 6, one of the standard top web generally used with bottom web 2.

The film of Example 1 reached 13 mm without breaking. This value is significantly higher than the values of the standard top web Comparative 6 having the same total thickness.

The packaging evaluation showed that the film of Example 1 according to the invention had very good formability and implosion resistance.

The films according to the invention of Ex. 2, 3 and 4 were evaluated in another implosion and formability test, performed at the same conditions described above at the temperatures and with the scores reported in the following Table 11b:

TABLE 11b

| Top film | Dome T. (° C.) | Implosion resistance (mm) | Formability | | | |
|---|---|---|---|---|---|---|
| | | | Webbing | LD Bridging | TD Bridging | Circular Bridging |
| Ex. 2 | 175 | 10.5 | 3.0 | 2.8 | 3.0 | 2.8 |
| Ex. 3 | 175 | 13.9 | 3.0 | 2.9 | 3.0 | 2.8 |
| | 190 | 13.7 | 3.0 | 2.9 | 3.0 | 2.8 |
| Ex. 4 | 175 | 13.5 | 3.0 | 2.9 | 3.0 | 2.8 |
| | 190 | 13.6 | 3.0 | 2.9 | 3.0 | 2.8 |

Dome height: 50 mm

The film according to the invention of Ex. 5 was evaluated in another implosion and formability test, performed at the same conditions described above at the temperature and with the scores reported in the following Table 11c:

TABLE 11c

| Top film | Dome T. (° C.) | Implosion resistance (mm) | Formability | |
|---|---|---|---|---|
| | | | Webbing | LD Bridging |
| Ex. 5 | 175 | 16.8 | 2.8 | 3.0 |
| | 190 | 16.4 | 2.6 | 3.0 |

Dome height: 100 mm

Example 15: Microwaveability

Marinated salmon was packaged on vacuum skin packaging machine CRYOVAC VS26 with 190° C. as dome temperature and 6 sec as vacuum time. The heating dome is in the form of a flat plate.

The top web used was the film of Example 1 and the supports were the following trays:

C-PET from FAERCH 2155-1E, black tray, dimensions 13 cm wide, 16 cm long, 50 mm deep C-PET FOAM 1620-45 produced by Silver Plastic, 16 cm wide, 20 cm long, 45 mm deep.

Another kind of package was manufactured with Mondini Trave 340 Tray skin machine (setting conditions: vacuum time 4 sec, dome temperature 170° C.) using the film of Ex. 3 and a C-PET tray from Faerch (dimensions: 180 mm×260 mm×130 mm). The packaged product was marinated chicken breast. The packages were put in the microwave for 4 minutes at 1000 W. During the cooking, they showed ballooning (the top web inflated as a result of the pressure exerted by the vapors coming from the food) and self-venting (the sealing between the top and the tray opened at one point on the long side allowing to release the vapors).

The packs were manually opened by two panelists after cooking: they were easy to be opened and the sealing force was homogenous and consistent along the package.

The salmon and the chicken breast resulted evenly cooked. It appears that the VSP packages manufactured from the films of the present invention are particularly suitable for use with ready-prepared foods, so-called "ready meals", which are intended to be warmed or cooked in a microwave oven.

In conclusion, the film of the present invention, endowed with good optical and mechanical properties, resulted highly formable and excellent in implosion, mechanically resistant to VSP cycle, sealable on supports of various chemical nature, especially on polyester-based materials such as APET, CPET and PETG supports, even monolayer, and sealable over a wider range of sealing temperatures.

The resulting VSP packages show an unexpectedly good drip retention capacity and are easy openable. The easy openability of the package, due to the peculiar composition of the cross-linked seal layer of the top film, advantageously allows using simple bottom webs devoid of easy openable systems.

Finally, the VSP packages of the present invention are also suitable for microwaveable treatment and endowed with self-venting feature during cooking.

The invention claimed is:

1. A cross-linked film suitable for use as top web in vacuum skin packaging comprising,
   an outer sealing layer a) comprising one or more (co)polyesters having a glass transition temperature (Tg) of 50° C. or less, measured according to ASTM D 3418 and/or a melting point temperature (Tm) of 170° C. or less, more preferably than 150° C., measured according to ASTM D 3418,
   an outer abuse layer c) comprising one or more polymer(s) selected from the group consisting of polyolefins and their copolymers, polyamides, polyesters, and styrene-based polymers.

2. The film of claim 1, wherein
   the (co)polyester(s) makes up at least 25%, by weight of the total weight of the sealing layer (a), and/or
   the outer abuse layer c) comprises at least 50 wt %, of the weight of layer c) or consists of one or more polymer(s) selected from the group consisting of polyolefins and their copolymers, polyamides, polyesters and styrene-based polymers.

3. The film of claim 1, wherein the (co)polyester of the sealing layer (a) comprises at least one aromatic dicarboxylic acid, at least one aliphatic dicarboxylic acid, and one or more glycol(s), wherein
   the at least one aromatic dicarboxylic acid is selected from the group consisting of terephthalic acid, isophthalic acid, phthalic acid, 2,5-, 2,6- or 2,7-naphthalenedicarboxylic acid and their admixture;
   the at least one aliphatic dicarboxylic acid is selected from the group consisting of saturated aliphatic dicarboxylic acids of formula $C_nH_{2n}(COOH)_2$ wherein n is from 2 to 8;
   the one or more glycols are aliphatic or cycloaliphatic glycols.

4. The film of claim 1, wherein the thickness of
   the sealing layer (a) is from 2 to 25 microns, and/or
   the thickness of the outer abuse layer (c) is from 2 to 25 microns, and/or
   the total film thickness is lower than 180 microns.

5. The film of claim 1, further comprising
   an inner barrier layer d), comprising at least one polymer selected from the group consisting of PVDC, polyamides, EVOH, polyesters, and blends thereof; and/or
   at least one inner polyamide layer e), and/or
   one or more inner bulk layer(s) f), comprising one or more polymers selected from the group consisting of ethylene homo- and co-polymers, ionomers, and ethylene-vinyl acetate copolymers.

6. The film of claim 1, comprising from 2 to 13 layers.

7. The film of claim 1, wherein the film is not heat-shrinkable.

8. The film of claim 1, further characterized by
an implosion resistance of at least 8 mm, and/or
a formability score for both webbing and bridging (longitudinal, transverse and circular) of at least 2, and/or
a gel content measured on the film, wherein at least one of the polymers are toluene-soluble before cross-linking, according to ASTM D-2765-01, of at least 25% by weight with respect to the film weight.

9. A vacuum skin package comprising a support, a product loaded onto said support, and a top film according to claim 1, said film being draped over the product and sealed over the entire surface of the support not covered by the product.

10. The package of claim 9, wherein said support comprises a sealing layer comprising a polymer selected from ethylene/vinyl acetate copolymers and polyesters.

11. The package of claim 9, wherein said support is a monolayer polyester or multilayer polyester based support, wherein said polyester is selected from the group consisting of polyethylene terephthalate (PET), crystalline polyethylene terephthalate (CPET), amorphous polyethylene terephthalate (APET), polyethylene terephthalate)-glycol (PETG), and their combinations.

12. The package of claim 9, wherein said support is compostable.

13. The package of claim 9, wherein said support comprises a surface made of aluminum.

14. The package of claim 13, wherein said support is made of aluminum and does not comprise a sealing layer.

15. The package of claim 9, wherein the support is made of steel.

16. The package of claim 9, wherein the product is a food product.

17. The package of claim 9, wherein the package is used for microwave applications.

18. A vacuum skin packaging process, in which the top film used is a film according to claim 1.

19. The process of claim 18, comprising:
providing a cross-linked top film, comprising an outer sealing layer a), according to claim 1,
providing a support,
disposing the film over the support, with the outer sealing layer a) facing the support;
disposing a product between the top film and the support;
heating the top film and moulding it down upon and around the product and against the support, the space between the heated top film and the support having been evacuated to form a tight skin around the product; and
tight sealing said top film over the entire surface of the support not covered by the product by differential air pressure.

20. The process of claim 18, wherein during the vacuum skin packaging process, the dome temperature is set lower than 220° C.

21. The use of a film according to claim 1, wherein the film is a top web for vacuum skin packaging applications.

* * * * *